US012483647B2

(12) United States Patent
Romero et al.

(10) Patent No.: US 12,483,647 B2
(45) Date of Patent: Nov. 25, 2025

(54) CUSTOMIZATION FRAMEWORK FOR NATIVE MOBILE APPLICATIONS

(71) Applicant: Salesforce, Inc., San Francisco, CA (US)

(72) Inventors: Eric Romero, San Francisco, CA (US); Stephen Goldberg, San Francisco, CA (US); Adam Liechty, San Francisco, CA (US); Bharath Marulasiddappa, San Francisco, CA (US); Scotland Peters, San Francisco, CA (US); Irfan Syed, San Francisco, CA (US); Chuxiong Wu, San Francisco, CA (US); Saket Agarwal, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 545 days.

(21) Appl. No.: 17/968,412

(22) Filed: Oct. 18, 2022

(65) Prior Publication Data
US 2024/0129402 A1 Apr. 18, 2024

(51) Int. Cl.
*H04M 1/27453* (2020.01)
*H04M 1/72403* (2021.01)

(52) U.S. Cl.
CPC .............. *H04M 1/72403* (2021.01)

(58) Field of Classification Search
CPC ......... H04M 1/72403; H04M 1/27453; H04M 1/2747; G06F 9/451
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |
| 6,161,149 | A | 12/2000 | Achacoso et al. |

(Continued)

OTHER PUBLICATIONS

"Google Plus Users", Google+Ripples; Oct. 31, 2011; 3 pages.

*Primary Examiner* — Angelica Perez
(74) *Attorney, Agent, or Firm* — Salesforce, Inc.

(57) ABSTRACT

A native user interface (UI) application of a mobile device includes a library of different components such as text, forms, tables, lists, maps, views and buttons. The components can also have associated actions in some cases. When a view of the UI is launched, the mobile device contacts a server or other data source to obtain metadata associated with the view. The metadata can be tailored to a user or organization of the mobile device. The metadata selects specific components and defines a layout for the components. The mobile device uses the metadata to retrieve the components and render them in the view. The views can be changed by changing the metadata without changing the native application.

20 Claims, 21 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |

(56) References Cited

U.S. PATENT DOCUMENTS

| | | |
|---|---|---|
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0215312 A1* | 7/2014 | Hicks .................. G06F 16/95 715/235 |
| 2014/0359537 A1 | 12/2014 | Jackobson et al. |
| 2015/0040104 A1* | 2/2015 | Mall .................. H04W 4/60 717/121 |
| 2019/0068703 A1* | 2/2019 | Vora .................. H04L 67/34 |
| 2022/0129282 A1* | 4/2022 | Lee .................. G06Q 10/10 |
| 2023/0037019 A1* | 2/2023 | Mata Rodriguez ..... H04L 67/75 |

\* cited by examiner

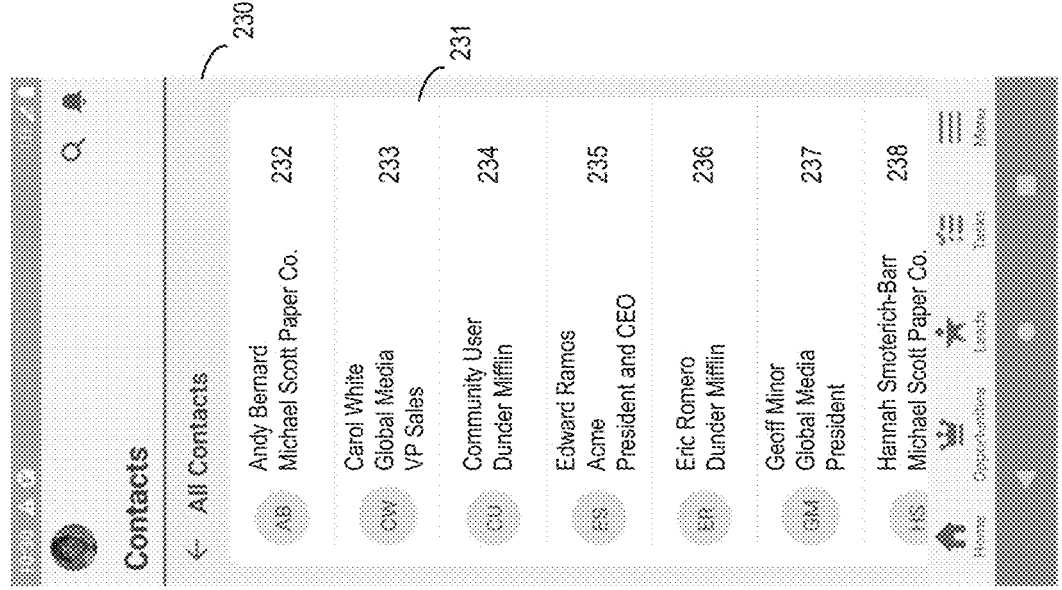
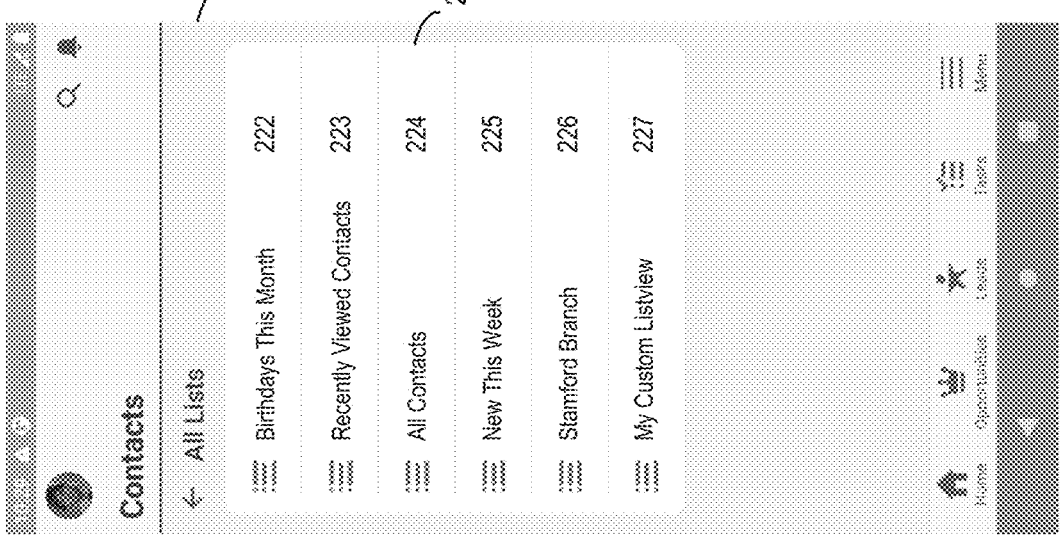
Figure 1E
Figure 1D

MCF Static Components 800

| Preview 800a | Component name 800b | Definition 800c | Bindable? 800d | Nestable? 800e | Properties 800f |
|---|---|---|---|---|---|
| 802 | SalesforceContainer/MCFContainer | mcf/container | N | Y | backgroundColor: Color |
| 804 Notifications — Winter Sale! Don't forget to inform our customers that from now until March, we have 50% off all widgets. Limit 1 per customer. | SalesforceCard/MCFCard | mcf/card | N | Y | |
| 806 | SalesforceLayout/MCFLayout | mcf/layout | N | Y | direction = [row, column] |
| 808 Scan / Take photo / Upload | SalesforceAction/MCFAction | mcf/action | N | N | action = [directions, scan barcode, take photo, upload] |
| ▬ | SalesforceButton/MCFButton | mcf/button | N | N | action = [navigate] label: String pageRef: String |
| 812 This text is fontSize8 This text is bold This text is normal This text is red | SalesforceText/MCFText | mcf/text | N | N | |
| | SalesforceSearchComponent/ MCFSearchComponent | mcf/searchcomponent | N | N | |
| 816 | SalesforceSpacer/MCFSpacer | mcf/spacer | N | N | |
| 818 ▬ | SalesforceDivider/MCFDivider | mcf/divider | N | N | |

Figure 8A

MCF Data-Bound Components 820

| Preview 820a | Component name 820b | Definition 820c | Bindable? 820d | Nestable? 820e |
|---|---|---|---|---|
| My Opportunities List<br>☆ Opportunity 1 — 831<br>Opportunity – Acme Account<br>☆ Opportunity 2 — 832<br>Opportunity – Acme Account<br>☆ Opportunity 3 — 833<br>Opportunity – Acme Account | SalesforceList/MCFList | mcf/list | Y | Y |
| (A) Account 1 — 835<br>Account | SalesforceRecordRow/<br>MCFRecordRow | mcf/recordRow | passed in | N |

Figure 8B

| MCF Plugin Components 840 | | | | |
|---|---|---|---|---|
| Preview 840a | Component name 840b | Definition 840c | Bindable? 840d | Nestable? 840e |
| Today's Events 846<br>7:00am-8:00am 847<br>Hit the gym<br>4655 Main St., San Francisco CA<br>Completed<br>9:00am-5:00pm 848<br>Paper Convention<br>1 Moscone Center, San Francisco CA<br>In Progress     845 | MCFPluginEventList | mcfp:/eventList | Y | Y |
| Recently Viewed Records 851<br>★ Opportunity 1 852<br>   Opportunity – Acme Account<br>Ⓐ Account 1 853<br>   Account     850 | MCFPluginRecentList | mcfp:/recentList | Y | Y |
| Today's Tasks 856<br>Ⓣ Sell more paper 857<br>Ⓣ Follow up with Fred 858     855 | MCFPluginTaskList | mcfp:/taskList | Y | Y |
| 9:00am-5:00pm 860<br>Paper Convention<br>1 Moscone Center, San Francisco CA<br>In Progress | MCFPluginEventRow | mcfp:/eventRow | passed in | N |
| Ⓣ Sell more paper 865 | MCFPluginTaskItem | mcfp:/taskItem | passed in | N |

Figure 8C

Easy Contacts Plugin Components 860

| Component name 860a | Definition 860b | Bindable? 860c | Nestable? 860d | Properties 860e |
|---|---|---|---|---|
| ECContactRow | ec/contactRow | Y | Y | Contact row shown in mru and listview |
| ECListviewList | ec/listviewList | Y | Y | Displays a list of listviews. Adds "View All Lists" button to the bottom. |
| ECListviewRow | ec/listviewRow | Y | Y | Listview row shown in recent lists and All Lists |
| ECContactList | ec/contactList | Y | Y | Displays a list of contacts |
| ECAllLists | ec/allLists | Y | Y | Displays All Lists page |
| ECLegacyToggle | ec/legacyToggle | N | N | Toggle to classic contacts |
| ECContactRowAction | ec/contactRowAction | Y | Y | Provides row actions to the ECContactRow |
| ECFeedbackRow | ec/feedback | N | N | Feedback row |
| ECNavBackHeader | ec/navBackHeader | N | N | Display header on left panel pages, i.e., Listview page, All Lists page |

Figure 8D

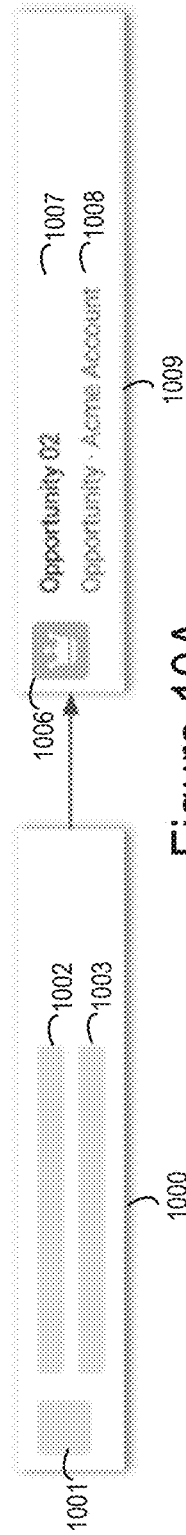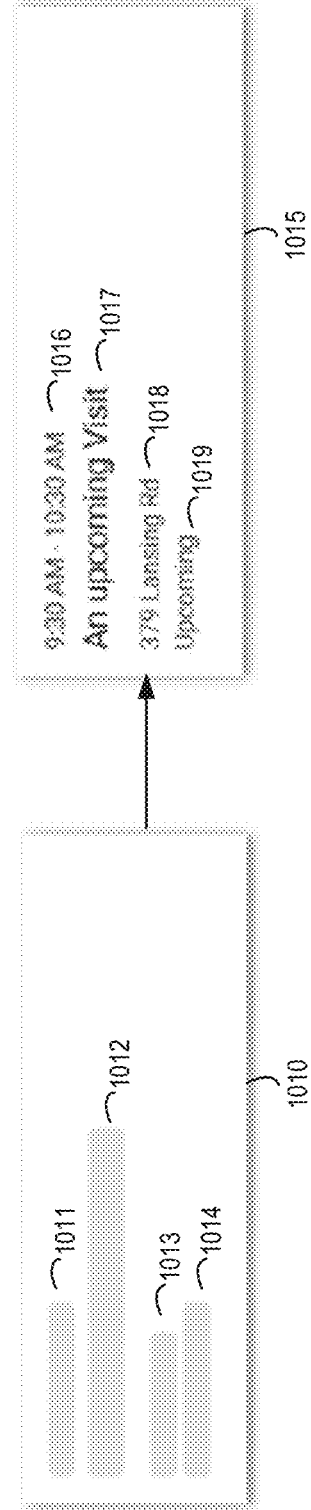

CUSTOMIZATION FRAMEWORK FOR NATIVE MOBILE APPLICATIONS

TECHNICAL FIELD

One or more implementations relate to the field of user interfaces (UIs) for mobile devices; and more specifically, to techniques for developing such interfaces.

BACKGROUND ART

Mobile user interfaces (UIs) are commonly provided on mobile devices such as smart phones and tablets to enable a user to interact with the device's applications, features, content and functions. A mobile is typically a graphic UI that relies on a touch-sensitive screen of the device. However, various challenges are presented in developing such As

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 1D depicts an example view 220 of an easy contacts all list, according to some example implementations.

FIG. 1E depicts an example view 230 of an easy contacts list, according to some example implementations.

FIG. 7A depicts a view of a feature (App Launcher) that is driven by layout metadata referred to as app_launcher.json, according to some example implementations.

FIG. 7B depicts MCF components 701 associated with the view of FIG. 7A, according to some example implementations.

FIG. 7C depicts a MCF 710 associated with the view of FIG. 7A, according to some example implementations.

FIG. 7D depicts a MCF plugin 720 associated with the view of FIG. 7A, according to some example implementations.

FIG. 7E depicts Features 730 associated with the view of FIG. 7A, according to some example implementations.

FIGS. 8A to 8D depict example components for use with MCF, according to some example implementations.

FIG. 8A depicts example MCF static components 800, according to some example implementations.

FIG. 8B depicts example MCF data-bound components 820, according to some example implementations.

FIG. 8C depicts example MCF plugin components 840, according to some example implementations.

FIG. 8D depicts example easy contact components, according to some example implementations.

FIGS. 10A to 10D involve stencils in a view for MCF data, according to some example implementations.

FIG. 10A depicts an example stencil for a record row component without nested components, according to some example implementations.

FIG. 10B depicts an example stencil for an event row component without nested components, according to some example implementations.

FIG. 10C depicts example sequences of stencils in which list data and record data are loaded, according to some example implementations.

FIG. 10D depicts example stencils for a contact list, according to some example implementations.

DETAILED DESCRIPTION

Figure 1A:
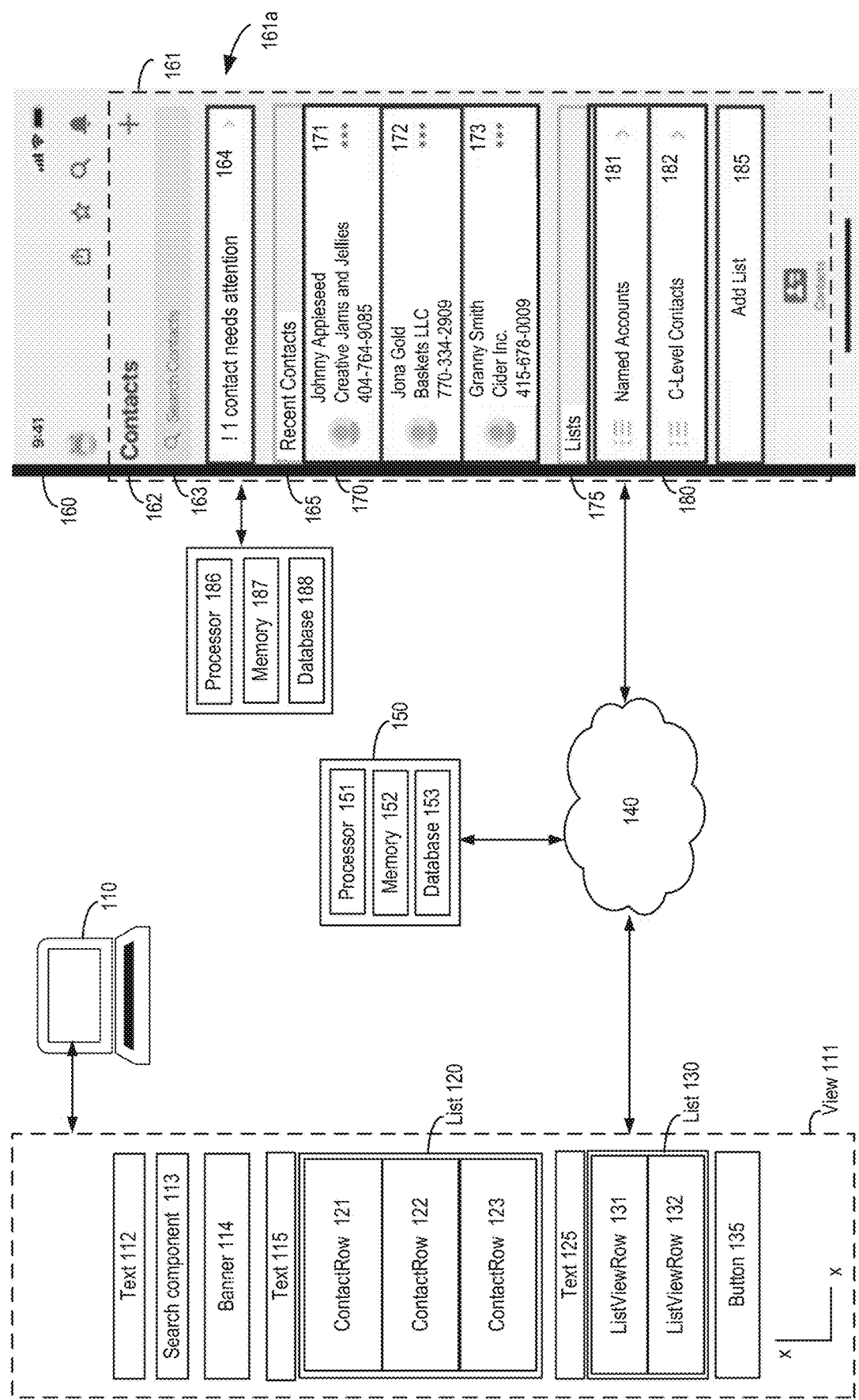
FIG. 1A depicts an example system for creating a user interface (UI) on a computing device, according to some example implementations.

The following description describes technologies for developing user interfaces for mobile devices.

A native user interface (UI) can be developed for a specific platform or device to optimize performance and the user experience. The native UI can account for characteristics such as the device's operating system and screen size and resolution. For example, a UI can be native to an operating system such as Android or iOS and to a particular model of smart phone or tablet. However, the native UI for mobile applications (apps) is determined at build time, forcing a one-size-fits-all experience for every user. Any changes to the native UI must be either distributed as an application update to the software, or predetermined and included in the initial software, to be later "unlocked" conditionally.

This inhibits customization and personalization for individual users or organizations. It also hinders product owners from experimenting with new native UI designs after the product is live since the "secondary test" layouts must be predetermined beforehand.

Additionally, development teams for mobile applications are constantly building new features from the ground up. Although there are established patterns to follow and common libraries can be used to facilitate the implementation of a native UI design, the native UI components and layouts themselves must still be created programmatically. This can be burdensome due to the high learning curve of application development and limited developer resources. Moreover, this approach is likely to result in inconsistencies across mobile platforms since they must be developed independently with different technology stacks. Features that contain common elements with other features are also prone to inconsistencies if they are built in isolation.

Another issue that development teams face is that long-lived features may get stale as new design themes are introduced. Although certain parameters such as colors, margins, and sizes can be tokenized, any non-trivial changes such as additional fields and layout updates can result in risky refactors. In software design, code refactoring refers to improving the design, structure, and/or implementation of the software while preserving its functionality. The improvements can involve improved code readability, reduced complexity and improved performance.

While these problems can be mitigated by using web apps within native apps, the performance and overhead of web apps are costly. Web apps also cannot take advantage of a mobile operating system to the same degree as a native application. Additionally, from a security perspective, the transfer of data across different layers of a technology stack can open up vulnerabilities.

The techniques disclosed herein address the above and other issues. In an example implementation, a framework is provided for a mobile computing device or other computing device in which a native UI is rendered based on metadata. The framework is referred to as a Mobile Customization Framework (MCF). The framework can be bundled with a basic set of native UIf components (such as Text, Buttons, Lists, etc.) but it can also be extended by consumers of the framework to provide feature-specific components and business logic.

In one aspect, the native UI application includes a library of different components such as text, forms, tables, lists, maps, views and buttons. The components can also have associated actions in some cases. When a view of the UI is launched, the mobile device contacts a server or other data source to obtain metadata associated with the view. Further, the metadata can be tailored to a user or organization of the mobile device. The metadata selects specific components and defines a layout for the components. The mobile device uses the metadata to retrieve the components and render them in the view.

The techniques provide a number of advantages. A first advantage is dynamic delivery. Since metadata is lightweight and can be stored in the cloud, features that are built upon the MCF can have dynamic designs and layouts. This allows features to be tailored for users based, e.g., on user type, organization, industry, or form factor. Product owners can also rapidly experiment with novel designs rather than going through the lengthy process of releasing an application update.

A second advantage is consistency. The same metadata can drive the design for multiple platforms to provide consistency. Since all features that are built upon the MCF can share the same components, there is consistency across the entire application. As MCF components are upgraded with new design themes or elements, MCF driven features will be refreshed as well.

A third advantage is fidelity. MCF components will be 100% native to their respective platforms, which ensures the highest possible fidelity and performance. They may also take full advantage of the many native capabilities and sensors that mobile platforms provide, such as NFC, Bluetooth, (GPS, camera, etc. Moreover, with direct access to platform application program interfaces (APIs), the security implications are minimized.

These and other advantages will be further apparent in view of the following discussion.

Overview

FIG. 1A depicts an example system for creating a user interface (UI) on a computing device, according to some example implementations. The system includes a computing device 110 on which a developer works to develop the layout of a UI view 111. In one approach, the developer uses a drag and drop application in which components of the UI are arranged in desired positions within the view. A drag and drop application builder is a tool that allows the developer to create a mobile or web application visually with pre-built UI elements such as forms, tables, lists, maps views, buttons, etc. on the screen. For example, Bento Builder is a web-based tool for dragging and dropping components onto a page to generate UEM metadata. UEM, or Universal Experience Model, refers to the overall layout metadata, in JSON format, for example JSON, or JavaScript Object Notation, is a lightweight format for storing and transporting data. The components can be represented by rectangles, circles, ovals or other basic shapes. The developer can select from among a variety of types of components.

In this example, the view 111 is for a smart phone and has a generally vertical layout. From top to bottom, the view includes a text component 112, a search component 113, a banner 114, and another text component 115. A list component 120 includes three row components 121, 122 and 123. These rows (ContactRow) are for contacts, e.g., names, addresses, phone numbers, email addresses and other contact information of people such as business associates, for example. An additional text component 125 follows, Another list component 130 includes two row components 131 and 132. These rows (ListViewRow) are for items of a list. A button component 135 is at the bottom of the view.

Note that the list component 120 is a parent component and the associated row components 121-123 are associated child or nested components. Similarly, the list component 130 is a parent component and the associated row components 131 and 132 are associated child or nested components.

Once the layout is prepared on the view 111, metadata which describes the layout can be transmitted via a network 140 to a server 150, which includes a processor 151, a memory 152 and a database 153. The memory can store instructions for execution by the processor to perform the functions described herein including communicating with the computing device 110 and the mobile device 160. The database 153 can store the metadata indexed in various ways such as by view identifier and tenant. For example, the database can be a multi-tenant database in which data is segregated for different tenants. A tenant can be, e.g., an organization or other set of users or an individual user. In this way, different metadata can be provided for different tenants but for a same view type. For example, different metadata can be provide for the Easy Contacts view 161 for different organizations or different users within the same organization. This allows for customization of the views using the same native application code at the mobile devices of the different users. Moreover, the metadata can easily be updated at the server to quickly implement changes such as new features.

As an example, with the Easy Contacts view, the view can include contacts together with lists as in the view 161 for one tenant, contacts only for another tenant, different font sizes and colors for different tenants and so forth.

A mobile device 160 is an example of a computing device which can run native applications. A native application is a software program that is developed for use on a particular platform or device. The mobile device includes a screen 161*a* on which a native application renders a UI display or view 161 corresponding to the view specified by the developer. To render the view, the mobile device contacts the server 150 via the network 140 such as when a user launches the view. The mobile device can include a processor 186, memory 187 and database 188. The memory can store instructions for execution by the processor to perform the functions described herein including communicating with the server 150 and rendering the components on the screen. The mobile device can also include a database 188 which stores the component data.

Based on the view which is to be rendered, the server accesses its database 153 to obtain the corresponding metadata and return it to the mobile device. The metadata contains information for arranging and displaying the components. For example, the metadata can describe the position for each component. The metadata can also identify visual parameters of the components such as color, font size and style or list size, e.g., the number of items in a list which are to be displayed at a time. In one approach, the metadata selects the visual parameters from among various options provided in the native application. By using metadata to select from among the available components which are part of the native application, and to describe the desired layout of the components, the developer can easily make changes to the view without changing the native application.

This example of the view 161 includes a component 162 with the text "Contacts" corresponding to the text component 112, A component 163 is a search box corresponding to the search component 113. A component 164 is a banner corresponding to the banner component 114. A component 165 includes the text "Recent Contacts" corresponding to the text component 115. A component 170 is a list corresponding to the list component 120, and the components 171, 172 and 173 are row components corresponding to the contact rows 121, 122 and 123, respectively. Each contact is allocated three lines of text. The number of lines of text is configurable by the metadata. A component 175 includes the text "Lists" corresponding to the text component 125, A component 180 is a list corresponding to the list component 130, and the components 181 and 182 are row components corresponding to the list view rows 131 and 132, respectively. A component 185 is a button with the text "Add List," corresponding to the button component 135.

Note that while the device 160 has the form factor of a smart phone, other mobile devices such as tablets could be used. Moreover, native apps can run on other types of computing devices as well such as laptops and personal computers (PCs).

Figure 1C:
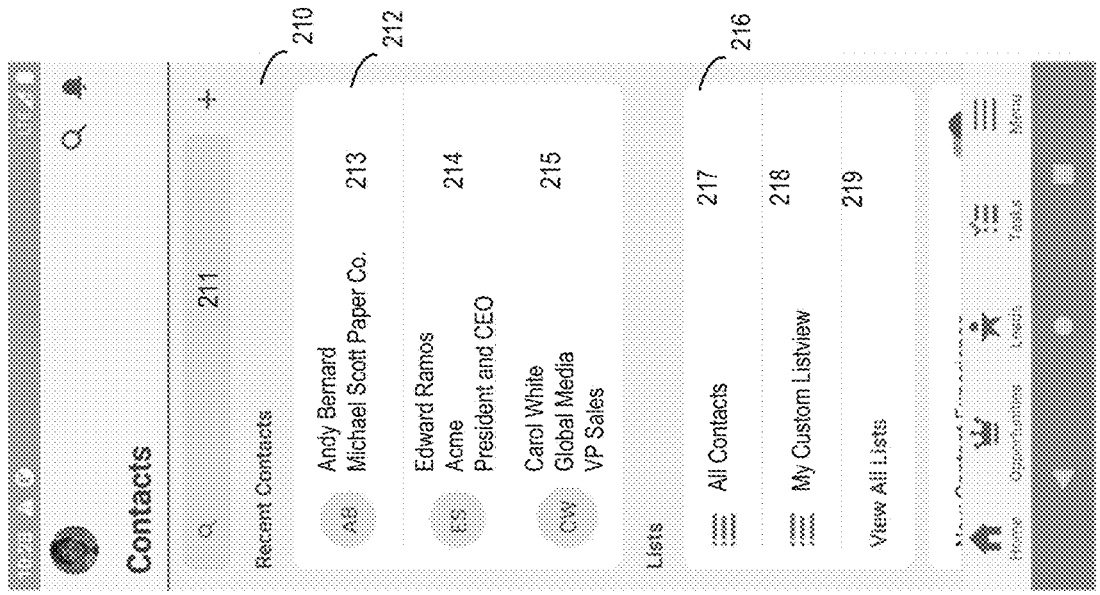
FIG. 1C depicts an example view 210 of an easy contacts home page, according to some example implementations.
Figure 1B:
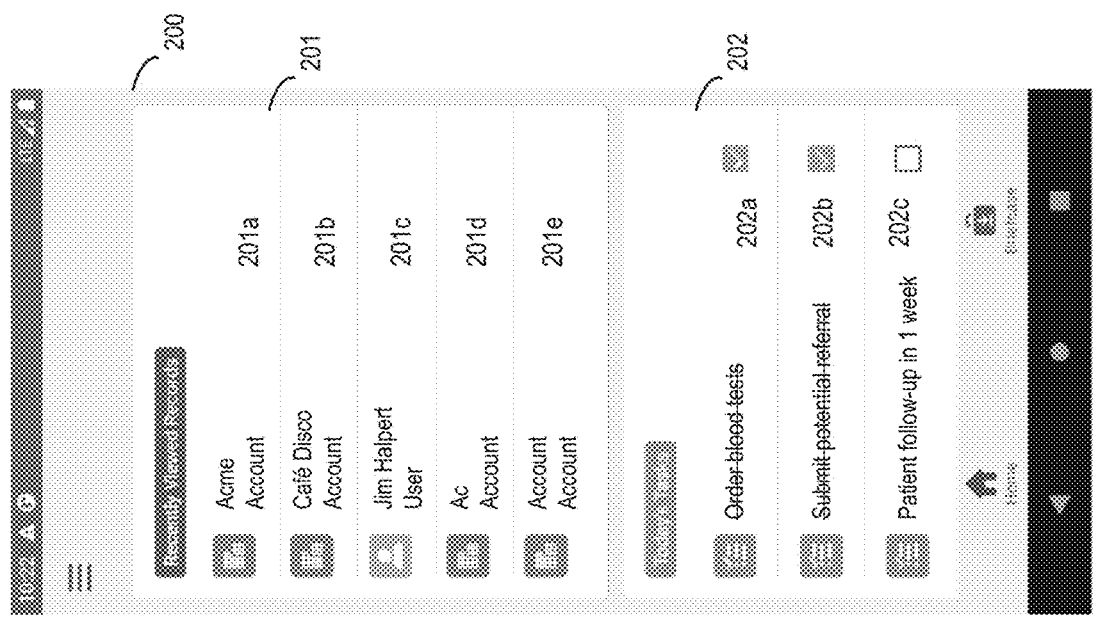
FIG. 1B depicts an example view 200 of a Mobile Customization Framework (MCF) home page, according to some example implementations.

FIG. 1B depicts an example view 200 of a MCF home page, according to some example implementations. The view includes a list 201 of recently viewed records 201*a*-201*e* and a list 202 of today's tasks 202*a*-202*c*. Each contact is allocated two lines of text and each task is allocated one line of text. Additionally, the recently viewed records include five records and today's tasks include three tasks. These characteristics are easily modified using the metadata.

FIG. 1C depicts an example view 210 of an easy contacts home page, according to some example implementations. The view includes a search component 211, a list 212 of recently viewed contacts 213-215 and a list 216 of items including All Contacts 217, My Custom Listview 218 and View All Lists 219. Each contact is allocated three lines of text.

FIG. 1D depicts an example view 220 of an easy contacts all list, according to some example implementations. The view includes a list 221 of items 222-227 which can be selected to access all available lists. The view is essentially a list of lists. Each list is allocated one line of text.

FIG. 1E depicts an example view 230 of an easy contacts list, according to some example implementations. The view includes a contacts component 231 with contacts 232-238 of people in respective rows of the view. Each contact is allocated three lines of text. The contacts consume the entire screen.

Figure 1G:
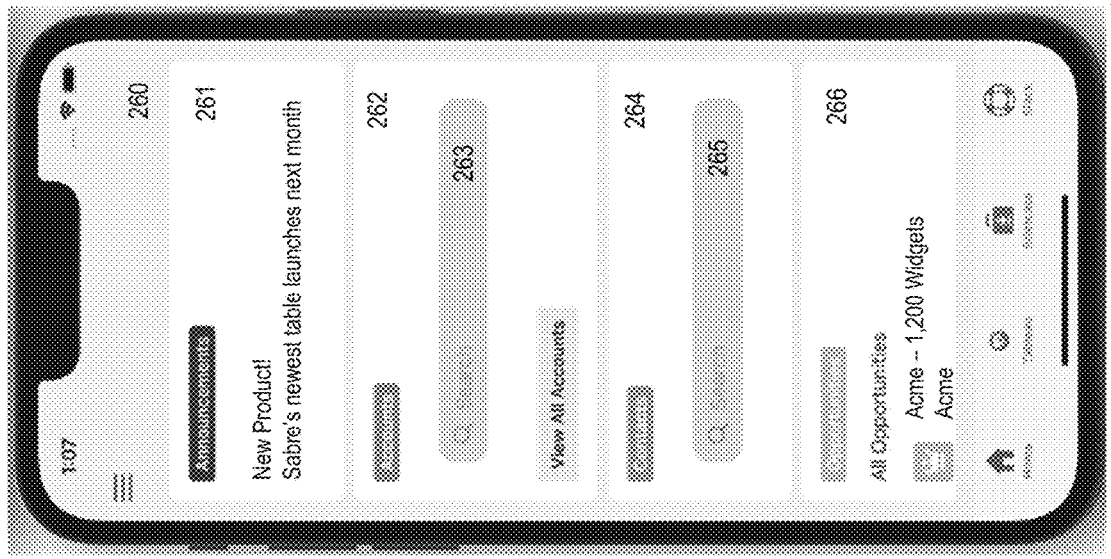
FIG. 1G depicts an example view 260 in which a row height for a list of contacts is not provided, resulting in a default height of 0, according to some example implementations.
Figure 1F:
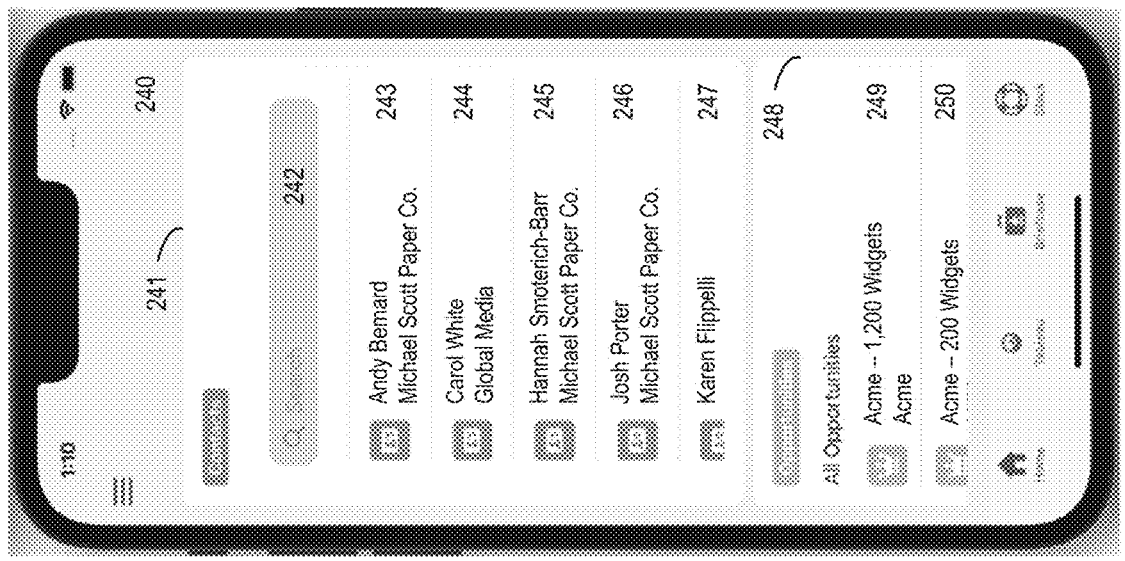
FIG. 1F depicts an example view 240 of a search component, a list of contacts and a list of opportunities in which a row height for the list of contacts is estimated, resulting in clipping of a last display contact row, according to some example implementations.

FIG. 1F depicts an example view 240 of a list of contacts and a list of opportunities in which a row height for the list of contacts is estimated, resulting in clipping of a last display contact row, according to some example implementations. The view includes a contacts region 241 with a search component 242 and a number of contacts 243-247. The last contact 247 is clipped in that part of it is not displayed. The view also includes an opportunities region 248 with opportunities 249 and 250. Each contact and each opportunity is allocated two lines of text.

FIG. 1G depicts an example view 260 in which a row height for a list of contacts is not provided, resulting in a default height of 0, according to some example implementations. The view includes a text component 261 with an announcement, an account component 262 with a respective search component 263, a contacts component 264 with a respective search component 265 and an opportunities component 266. Since the height of the contacts component is 0, no contacts are listed but the search component allows the user to search out contacts.

Figure 1H:
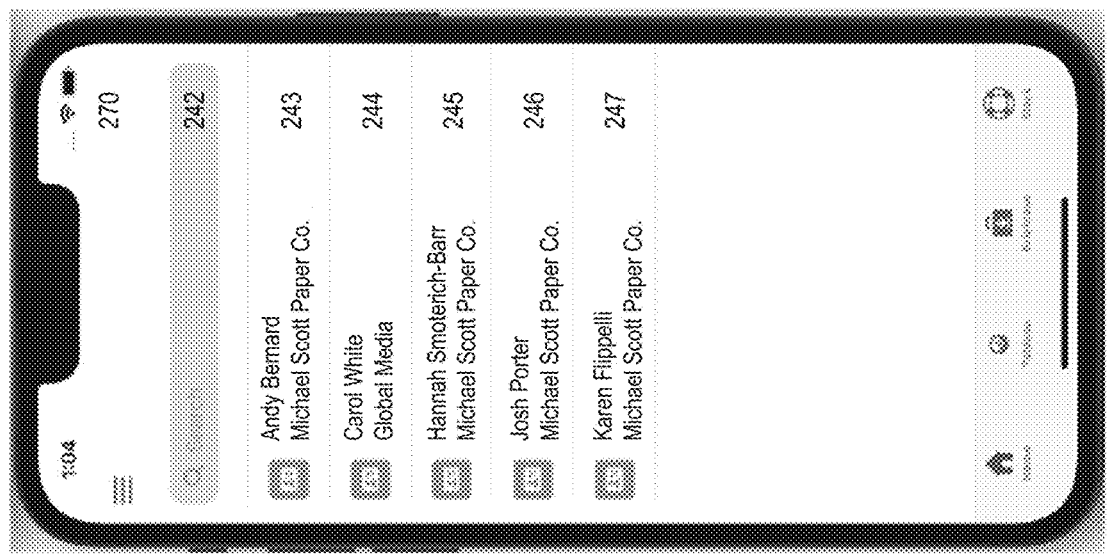
FIG. 1H depicts an example view 270 in which a list of contacts consumes the full screen height, according to some example implementations.

FIG. 1H depicts an example view 270 in which a list of contacts consumes the full screen height according to some example implementations. The view includes a search component 242 and contacts 243-247 of people in respective rows. In this example, there are no additional contacts to display but, if there were, they could consume the entire screen, Each contact is allocated two lines of text.

Figure 1I:
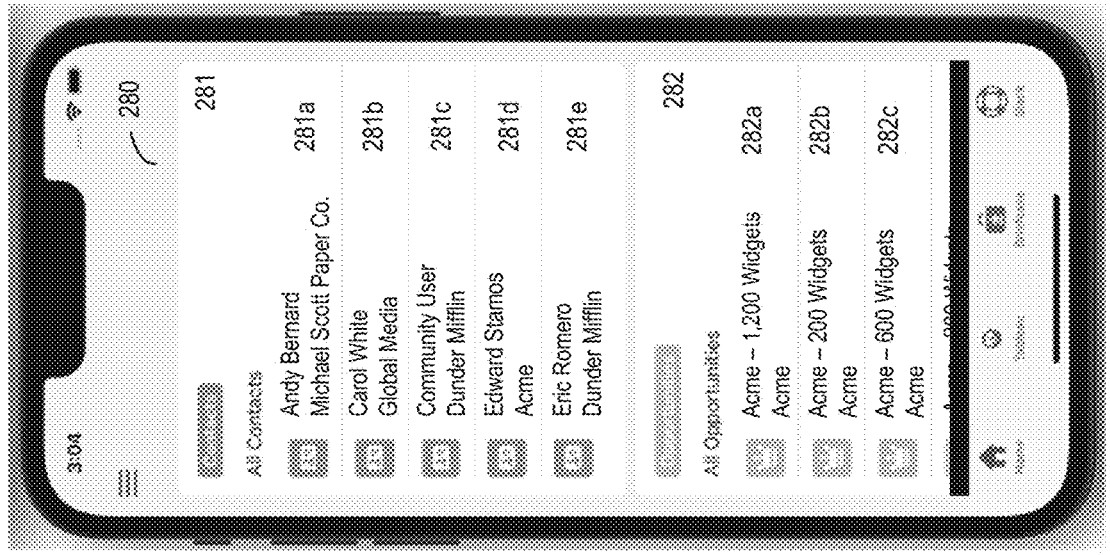
FIG. 1I depicts an example view 280 which includes a list of contacts 281 and a list of opportunities 282, according to some example implementations.

FIG. 1I depicts an example view 280 which includes a list of contacts 281 and a list of opportunities 282, according to some example implementations. The list of contacts includes contacts 281*a*-281*e* of people in respective rows, and the list of opportunities includes opportunities 282*a*-282*c* in respective rows. Each contact and each opportunity is allocated two lines of text. The view is similar to that of FIG. 1F but does not include the search component.

Figure 2A:
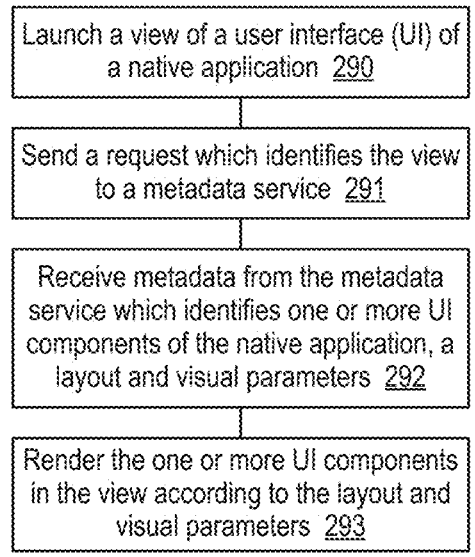
FIG. 2A depicts a flowchart of an example method performed at the mobile device 160 of FIG. 1, according to some example implementations.

FIG. 2A depicts a flowchart of an example method performed at the mobile device 160 of FIG. 1, according to some example implementations. Step 290 includes launching a view of a user interface (UI) of a native application. This can involve, e.g., the user launching the home or landing page view of an application by touching an icon on a touch screen of the device, or launching a new view of the application by interacting with components of the application, e.g., by touching a component of the view, performing a sliding motion with the finger, and so forth. Example views are provided in FIGS. 1A to 1I, 7A and 9.

Step 291 includes sending a request which identifies the view to a metadata service, e.g., the server 150. For example, the view can be for a list of contacts or other items, or for the home view of an application. Each view can have an associated identifier. For example, the view 161 of FIG. 1A can have the identifier "Easy Contacts," and the views of FIG. 1B to 1E can have the identifiers "MCF home," "Contacts home," "Easy Contacts All," and "Easy Contacts List," respectively. The mobile device can send other information as well with the request to the server such as a tenant identifier indicating an organization or user of the mobile device. In another approach, the tenant identifier is established when the mobile device establishes a connection with the server and; or the user logs into an account with the metadata service provider.

Step 292 includes receiving metadata from the metadata service which identities one or more UI components of the native application, a layout and visual parameters. The metadata can be in any format. One example format is JSON. The metadata can identify the components based on an associated name for each component, e.g., "text," "search", "banner", "custom list," "custom list row," "contact list," "contact list row," "button," and so forth. See also FIGS. 8A-8D for examples of components.

Step 293 includes rendering the one or more UI components in the view according to the layout and visual parameters. In some approaches, the native application requests metadata each time a new view is launched. The rendering or displaying of the components is based on information in the metadata indicating where the components should be displayed. For example, the metadata may indicate that a component is to be displayed in a region of the view which corresponds to ranges of x and y coordinates, where the range of x coordinates indicates a horizontal extent of the region and the range of y coordinates indicates a vertical extent of the region. The metadata can therefore describe the positions of the components in the view. The metadata can include other information as well for rendering the components such as text size, color and so forth. For some components, the metadata describes a direction for a display.

In addition to describing the appearance of the components, the metadata can describe associated actions such as directions, scan barcode, take photo, upload file and navigate. See, e.g., FIG. 8A. When a component is selected by the user such as by touching on the visual representation of the component on the screen, the associated action is performed. The instructions for performing the actions can be part of the native application so that the metadata does not need to specify details of the actions. For example, the metadata can simply identify that a photo is to be taken when a particular component is selected by the user. The native application then handles interactions with the camera of the mobile device, which may involve knowing the type of camera which is installed in the mobile device, along with the camera's capabilities and communication protocol. The metadata need not specify these details which are specific to the mobile device.

As another example, the native application allows the component to access other hardware and native features of the mobile device such as a Local Positioning System (GPS), Near Field Communication (NFC) and Bluetooth, without the metadata having to specify details of the access protocols. For example, the metadata may indicate that the user's location should be determined in which case the native application determines the location such as by obtaining data from a GPS circuit of the device and/or obtaining data regarding a Wi-Fi network connected to the device.

As another example, to provide a search function in a view, the metadata need only identify the search component. The native application will then handle the search process including accessing records in its database 188 based on a protocol of the native application by which the records are stored and searched. The metadata need not specify these details which are specific to the mobile device.

Figure 2B:
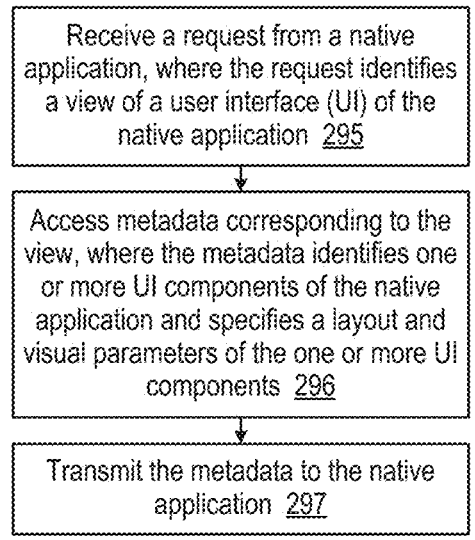
FIG. 2B depicts a flowchart of an example method performed at e server 150 of FIG. 1. according to some example implementations.

FIG. 2B depicts a flowchart of an example method performed at the server 150 of FIG. 1, according to some example implementations. Step 295 includes receiving a request from a native application, where the request identities a view of a user interface (UI) of the native application. The view can be identified such as discussed in connection with 291 of FIG. 2A.

Step 296 includes access metadata corresponding to the view, where the metadata identifies one or more UI components of the native application and specifies a layout and visual parameters of the one or more UI components. For example, the processor 151 can access, e.g., read, the metadata from the database 153. Step 297 includes transmitting the metadata to the native application.

In another approach, the mobile device can store metadata locally such as discussed in connection with the briefcase feature of FIG. 9. This allows the metadata to be accessed when the mobile device is offline.

Implementation Details

Figure 3:
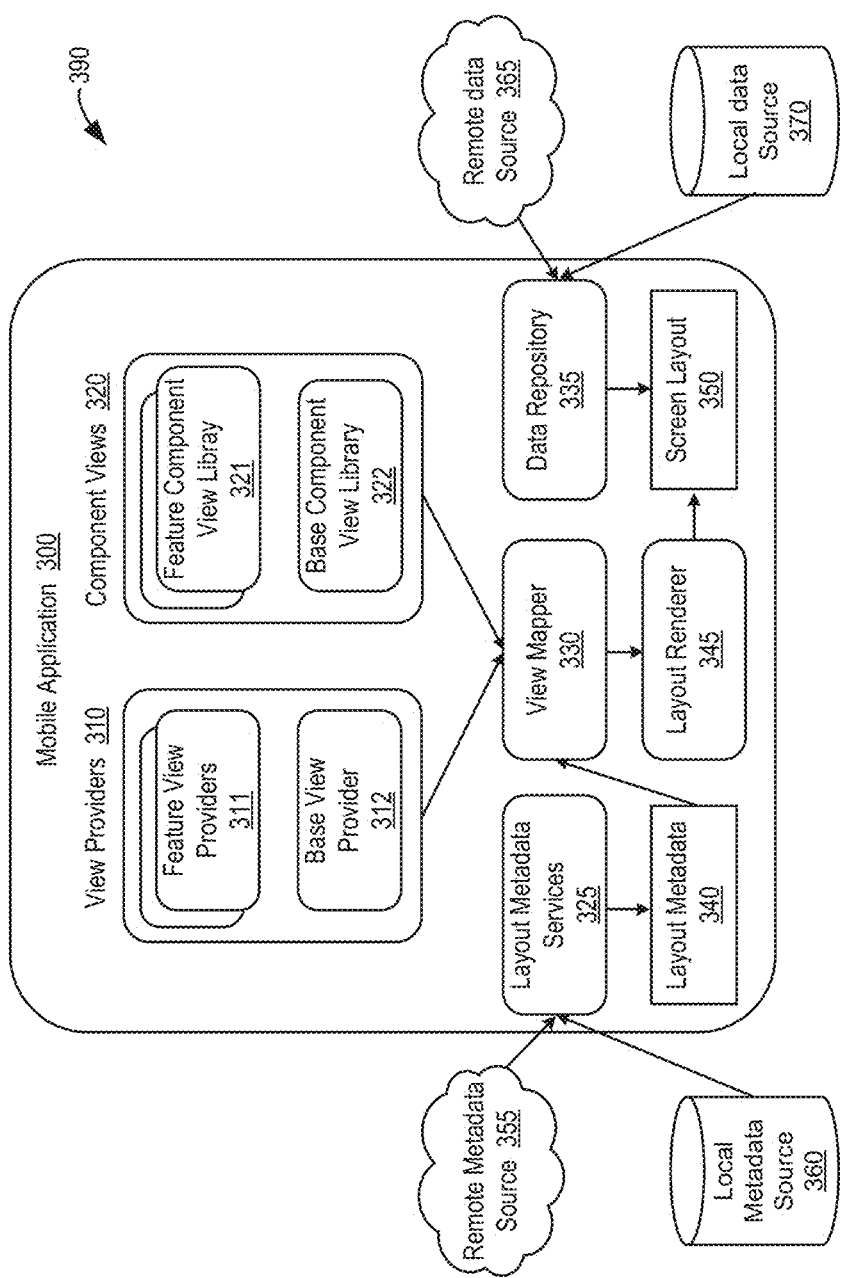
FIG. 3 depicts a MCF framework 390, according to some example implementations.

FIG. 3 depicts a MCF framework 390, according to some example implementations. The framework includes a mobile application 300, and remote and local metadata and data sources. A se of view providers 310 includes a base view provider 312 and feature view providers 311. Similarly, a set of component views 320 includes a base component view library 322 and a feature component view library 321. The base component views are for basic components such as a button, label or image. The feature component views are for bespoke components such as a contacts row which may include a call button or an e-mail button. The base and feature view providers understand the base and feature components, respectively, as described in the metadata. The view mapper 330 matches the components with their definitions from the layout metadata using the view providers. It collects the component views in the right order and sends them to the layout renderer 345.

The layout renderer is responsive to the layout metadata 340 as provided by the view mapper to create the layout or arrangement of the components on the screen at the screen layout 350. A final step is to bind data to the components that are rendered on screen. For example, consider a contact row component. When it comes from the component views library, it is in the form of a template. It is not until it is laid out that it starts fetching data to populate that template with actual data from the data repository 335. This data could include, for a given record ID, the context, first name, last name and phone number for a contact. The data repository can read a local data source 370 such as a cache when the mobile device is offline or just for performance reasons. If the data repository does not have any cache data, it attempts to fetch that data from a remote data source 365. This can involve making API calls to the cloud, e.g., a server in a network, to request, for a given record ID, the context, first name, last name and phone number for a contact.

The layout metadata is obtained from layout metadata services 325 which can receive the metadata from a remote metadata source 355 and/or a local metadata source 360.

Figure 4:
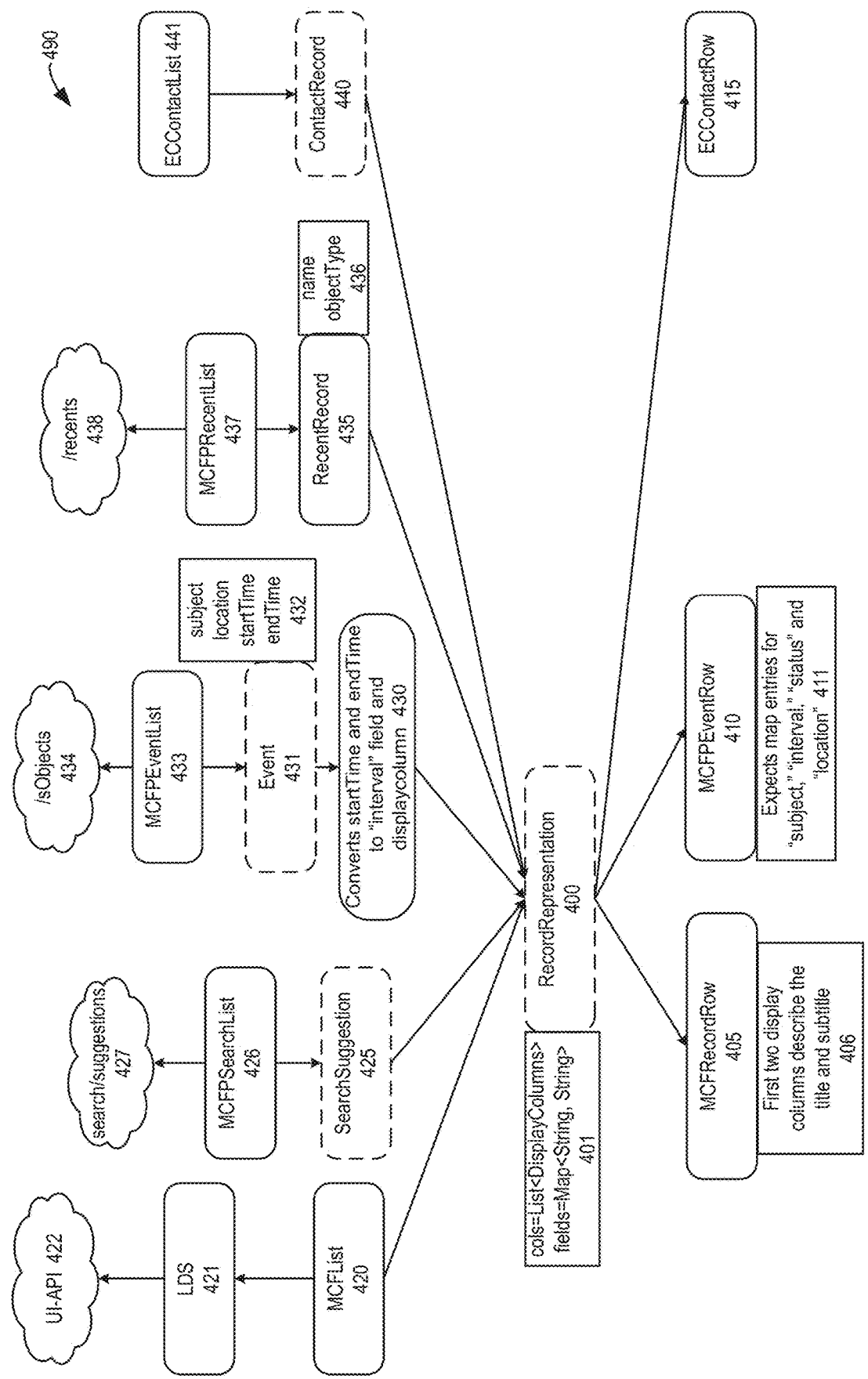
FIG. 4 depicts a MCF data model 490, according to some example implementations.

FIG. 4 depicts a MCF data model 490, according to some example implementations. The model involves lists such as a search list, event list, recently viewed list or contact list. RecordRepresentation 400 is at the center of the model. RecordRepresentation can have a format including columns (cols)=List<DisplayColumns>(columns) and fields=Map<String, String>(box 401). RecordRepresentation is used at MCFRecordRow 405 for a list other than an event or contact list, MCFPEventRow 410 for an event list and ECContactRow 415 for an "easy contact" (EC) contact list. MCFRecordRow has a format in which the first two display columns describe the title and subtitle (box 406). MCFPEventRow expects map entries for "subject," "interval," "status" and "location" (box 411).

Additionally, RecordRepresentation 400 receives list data from MCFList 420, a SearchSuggestion 425, an Event 431, a RecentRecord 435 and a ContactRecord 440. MCFList can obtain list data by contacting a UI-API 422 via a network using a LDS 421.

LDS, or Lightning Data Service, is a data repository that components use to retrieve data. It handles calling the API and storing the data to a local cache for offline availability.

The SearchSuggestion is from MCFPSearchList 426 which can contact search/suggestions 427 via a network. The event data from Event 431 is processed by converting startTime and endTime to "interval" field and display column (block 430). Event can include a subject, a location, a startTime and an endTime (block 432). Event can receive event data from MCFPEventList 433 which in turn can contact/sObjects 434 via a network. RecentRecord can include a name and objectType (box 436), RecentRecord can receive recent records of a list from MCFPRecentList 437 which in turn can contact/recents 438 via a network. ContactRecord can receive contact list records from ECContactList 441.

Implementation

The implementation for Mobile Customization Framework (MCF) contains four major elements, in one approach:

1. MCF Components

MCF provides a base set of native UI components that are re-usable across features. These components can be used atomically and composed into a larger experience, but are still robust enough to display a unit of data or perform a single action. Some components can nest other components within them. Examples include a. Card container, a RowLayout container that displays child components horizontally, or a List container which displays one child component per row of list data.

2. Data Binding

The purpose of some MCI components is to display data to the user. This is achieved in one of two ways: Either the component has the displayable data passed in as a parameter, or enough contextual information is passed in for the component to make its own request to fetch data. When the data is determined, the component displays the data within its UI. While data is loading, a stencil can be shown as a placeholder. Data can be stored on disk for performance gains and offline capability by the data repository.

For example, a List component would have the list id passed in as a parameter. It then requests data from a data repository to fetch information for every row to be displayed within that list. Once the data is determined, it renders a child component and passes in the row information to that child component. For a Customer Relationship Management (CRM) application the child component is an Account Record Row component and the parent List component would have passed in the display information to the Account Record Row for each Account record in the list data.

3. Metadata Service

MCF components can be 'hard coded' programmatically, but a useful feature is the ability to organize components hierarchically via metadata. Each component is configurable with a limited set of parameters that describe the UI (font size, color, list size, etc.) as well as the data (list id, record actions, etc.).

First, the application makes a request to the metadata service. This request contains parameters for the filename and source of a particular screen layout/view, whether it is locally bundled inside the application or hosted remotely. The service fetches the metadata and deserializes it into a layout model that the Mobile Customization Framework can render.

4. View Mapper

When the layout model is received by the framework, the tree of components is traversed using the MCF View Mapper. The MCF View Mapper compares the component definition of the current node against a list of registered View Providers. Each View Provider can be checked for compatibility for a given definition, and if true will return the associated component.

For instance, the MCF Base View Provider maps the definitions for "mcf/text" and "mcf/card" (FIG. 8A) and will return the Text and Card components, respectively, for MCF to render.

By using a registry of View Providers, features can provide their own custom components that are mapped from custom definitions. An example of this is a feature that displays Contact CRM data in a list and allows users to dial the Contact phone number directly. This feature would register a View Provider that maps "contactFeature/contactRow" to a custom Contact Row component that includes a "phone" icon.

MCF Features

1. Organization Hosted Metadata

The MCF provides the capability to render native UT based on metadata that is hosted on a multi-tenant database in order to allow different experiences for different users and organizations. At Salesforce, this is achieved this web technologies, but have yet to achieve this with native mobile platform code until now. Previously, one could make minor configuration changes with metadata such as re-arranging table columns or layout fields.

2. Data Binding

The MCF provides a method of collecting data in a parent component and passing it on to arbitrary child components. Typically a "child" component such as a single list item layout is fixed at build time. However, our method allows for arbitrary child components that are determined at run time with metadata to display the relevant data in any way it chooses. For instance, a generic MCF List component can be configured with either a standard Record Row or a more specialized Contact Record Row. Our method for data binding allows either to be used interchangeably.

3. Extensibility

MCF can be extended to allow features to contribute their own components that can be defined by metadata. This allows development of any type of feature they wish and still take advantage of the benefits that MCF provides, namely the metadata driven layouts for rapid development and experimentation.

4. Experimentation

The MCF framework allows for any combination of components to be rendered for a virtually limitless set of layouts to experiment with after the application has been downloaded and installed on a mobile device. Analytics can be collected that describe the layout and engagement to measure the overall effectiveness and drive product decisions.

5. Machine Learning

Machine Learning models can be trained on usage analytics to predict optimal layouts for different user types, organizations, and industries. The application can use this information to self-generate metadata. Generally, machine learning can identify usage patterns of the UIs based on the requests. This can include, e.g., how often a particular view is launched, the amount of time a user spends on a particular view, and usage of particular views at different days and times. The patterns can be further categorized based on user or organization, for example. The machine learning may learn that a particular component, e.g., an opportunity list, in a view is not frequently used, while another component, e.g., a contact list is frequently used. This information can guide developers in modifying the metadata to improve the user experience. Moreover, software can potentially automate the modification of the metadata.

6. Layout Building Tools

Builder tools can be used by administrators to create their own layouts to suit the needs of their users. The builder tools can generate metadata that is hosted on their partition of a multi-tenant database that MCF can read and render. In this way, administrators can create bespoke native features for their users without the need to build and release their own application.

Mobile Customization Framework Architecture

MCF is a runtime customization platform that can create and change native experiences based on metadata without recompiling the application.

1. Goals

The goals of the MCF are to offer the ability to build unique native home experiences from the ground up. These experiences are rendered with native performance and UI, have access to native device sensors, and work offline.

MCF is designed to work alongside the Lightening Web Runtime (LWR) in an example approach. LWR is a technique to configure and load modules, services, and dependency providers to build a JavaScript application.

In some cases, MCF is not designed to be a replacement for the full-featured, Turing-complete extensibility of LWC and the Lightning SDK. LWC, or Lightning Web Components, is a programming model to develop Salesforce lightning components. It is a UI framework that is built using native Hypertext Markup Language (HTML) and JavaScript. The following constraints will help solve specific use cases with the best possible user experience (UX).

a. Read-only data binding. Screens are views of data backed by LDS, but there will not be UVM components that support editing of Salesforce data, in some cases. However, MCF and Lightning SKD (LSDK) work well together, and a native MCF Home screen can be easily built with actions that launch LWC screens in LSDK.

b. No business logic. To reduce complexity, MCF may have no support for expression evaluation, branching logic, or conditional UI. In other cases, business logic can be supported.

2. Architecture

Figure 5:
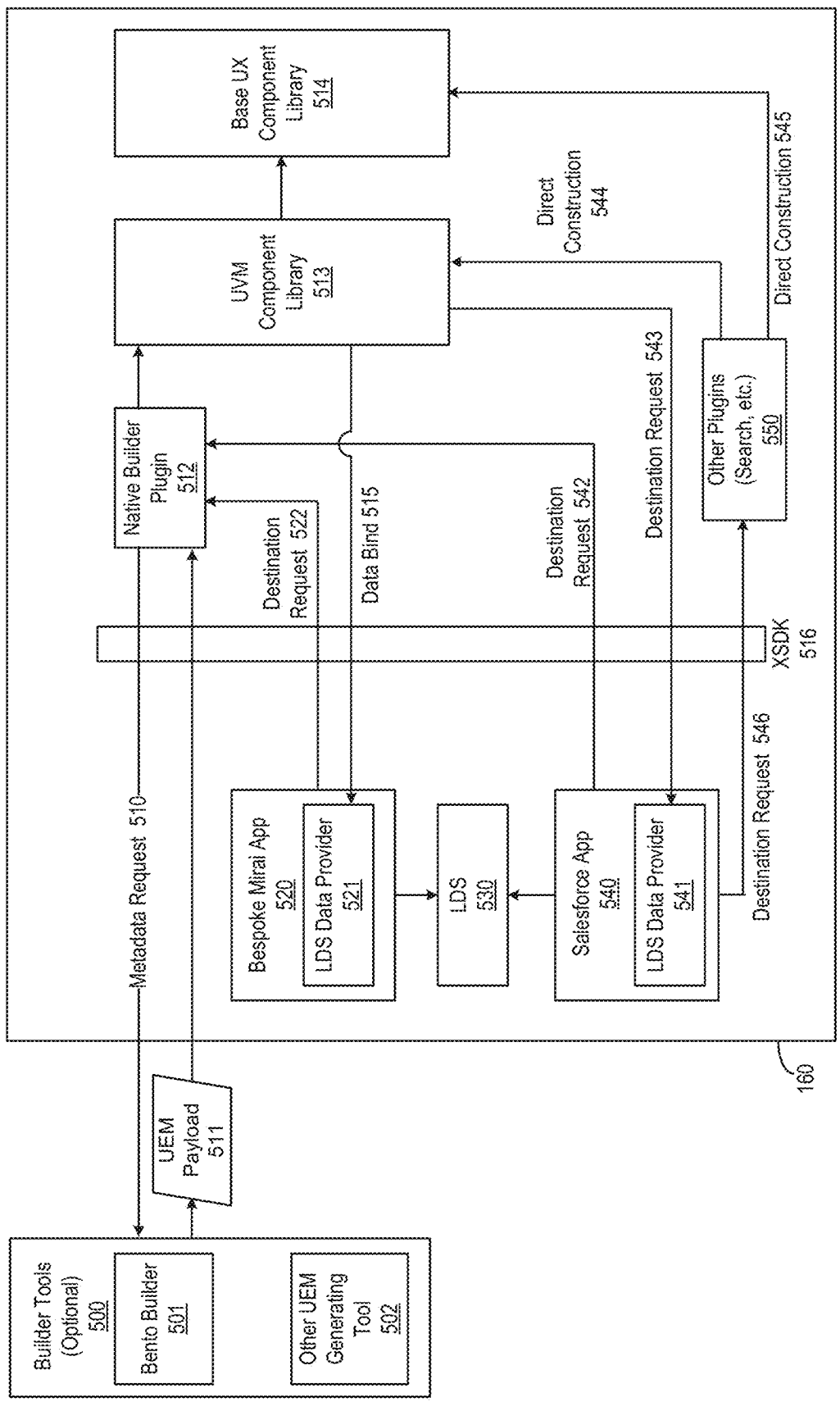
FIG. 5 is a component diagram of a MCF architecture, according to some example implementations.

FIG. 5 is a component diagram of a MCF architecture, according to some example implementations. A set of builder tools 500 can be used by the developer to develop a layout or view 111 such as in FIG. 1A. The tools can include the Bento Builder 501, which is an example of a drag and drop tool, or other UEM generating tool 502.

The mobile device 160 interacts with the builder tools by transmitting a metadata request on a path 510 from a native builder plugin 512 and receiving, in response, metadata in the form of a UEM payload 511. The native builder plugin can access a UVM Component Library 513 which in turn can access a Base UX Component Library 514. UVM, or Universal View Model, refers to a single component definition inside the metadata. Plugins can include features within the mobile application. e.g. "easy contacts."

The metadata request is responsive to a destination request on path 522 from a bespoke Mirai application or a destination request on path 542 from a Salestbrce application 540, or other application. The bespoke or custom Mirai application includes a Lightning Data Service (LDS) data provider 521. Lightning Data Service is a centralized data caching framework which is used to load, save, create and delete a record without server-side Apex code. Apex is a strongly typed, object-oriented programming language that allows developers to execute flow and transaction control statements on Salesforce servers in conjunction with calls to the API. The LDS data provider 521 receives a data bind on path 515 from the UVM component library. The LDS data provider is one example implementation that can/will response to data hinds. The Salesforce application 540 includes a LDS data provider 541, which can receive a destination request on path 543 from the UVM components. The Salesforce application can provide a destination request on a path 546 to other plugins 550 (search, etc.). The other plugins provide a direct construction to the UVM components on path 544 and a direct construction to the Base UX Component Library on a path 545. The bespoke Mirai application 520 and the Salesforce application 540 both access the LDS 530.

XSDK. 516 represents an extension software development kit that facilitates common mobile application services, such as network, cache, and navigation.

3. UX Primitives

At the root of the Native Builder plugin 512 are a set of UX primitives defined by UEM metadata. These components are documented here, including properties, layout, UEM, and rules for composition.

The Base UX Component Library 514 is a collection of reusable, Salesforce styled UX primitives. In one approach, the primitives are implemented in SwiftUI, which is a UI toolkit for building apps across platforms of Apple Corp. In another approach, the primitives are implemented in Jetpack Compose, which is a native UI toolkit for the Android operating system. Other tools can be used as well. Application developers may use this library directly or as a result of using the UVM UX Components 513. The base UX components can have a desired overall look and behavior.

The UVM Component Library 513 is a set of serializable UX components modeled on the UVM structure. In addition to offering strong typing of UEM components and properties, these components expose a data provider interface for binding to data sources. These components depend on the base UX Component Library 514. Similar to the Base UX Component Library, the UVM Components may be constructed directly. However, these components may also be deserialized from UEM JSON.

4. Data Providers

In order to support data binding UVM components to data sources beyond Lightning Data Service (LDS), A simple data interface/protocol is exposed in which the application is implemented. This prevents the UVM Components from having a direct dependency on LDS or the Lightning SDK and allows use in the Salesforce application, which does not use LDS. It can be assumed that LDS is available.

Figure 6:
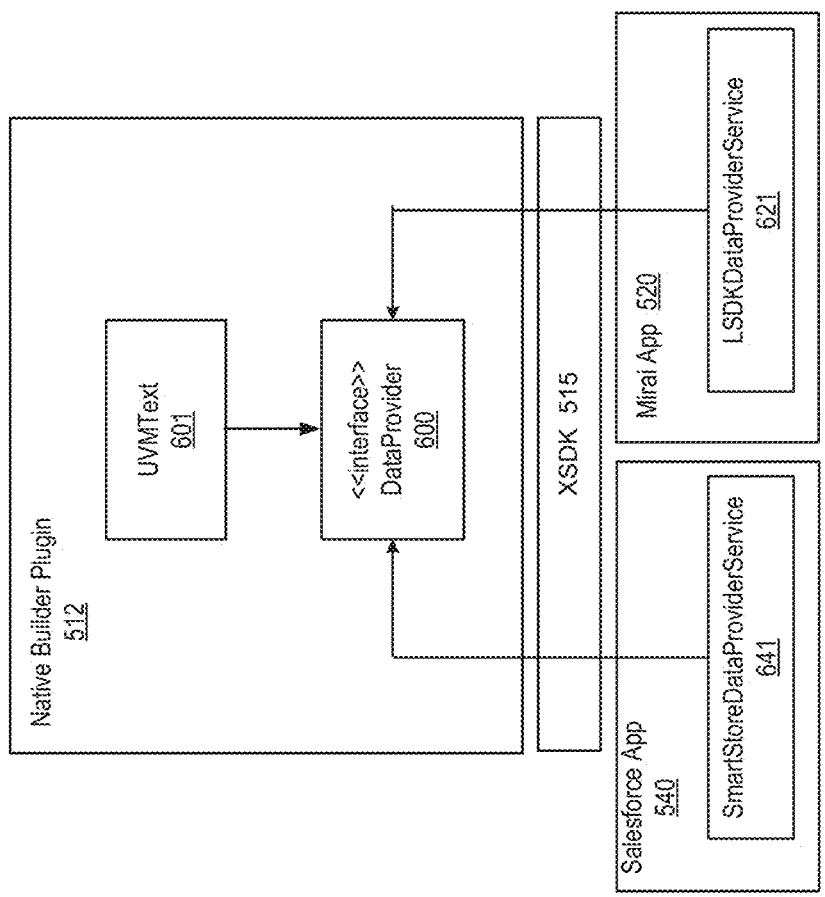
FIG. 6 is a block diagram depicting an interface/protocol 500 between the Native builder plugin 512 and the Salesforce App 540 and the Mirai App 520 of FIG. 5, according to some example implementations.

For example, FIG. 6 is a block diagram depicting an interface/protocol 600 (<<interface>>DataProvider) between the Native builder plugin. 512 and the Salesforce Application (App) 540 and the Mirai App 520 of FIG. 5, according to some example implementations. The interface/protocol receives data from UVMText 601, SmartStoreDataProviderService 641 and LSDKDataProviderService 621. UVMText is one example of natively rendered control. The SmartStoreDataProviderService and LSDKDataProviderService are two different implementations of the service interface DataFrovider. FIG. 6 illustrates that the UVM controls have a dependency on an abstract interface rather than a particular implementation and thus are unaware of the ultimate source of the data they are bound to.

Some UVM Components support data binding. Data binding requires specifying an object, record, or field context in the UEM for the component. The result of doing so will vary by component. As an example, a Field Label component is label text that pulls its value from an associated record field.

Composed components also inherit data binding context from their parents. Data binding is the process that couples two data sources together and synchronizes them. For instance, a Field Label that is composed within a List Component will inherit the record context from the row, and the object context from the list itself.

In the event a data-bound component experiences a failure during data binding, the component will display an error view. This view is dependent on what the component is. For example, an image might display a broken image while a label might display the actual error.

5. Actions

To support a wide range of business logic, a finite set of actions are definable in UEM.

Direct use of UVMComponents or Base UX Components in code may offer flexibility beyond what is exposed via UEM. These actions include: Create, Edit, Call, and Navigate.

The Create Action will employ a page reference (ref) with a "new" actionName. The navigation stack in the host application can translate this pageRef navigation as necessary for whichever runtime environment is in use. Lightning Web Runtime can be used, for example. This action requires an object context.

The Edit Action will employ a page reference with an "edit" actionName. The navigation stack in the host application can translate this pageRef navigation as necessary for whichever runtime environment is in use. Lightning Web Runtime can be used, for example. The Edit action requires a Record context.

The Call action will trigger a phone call using data from the associated record context. A property can specify which field of the record is the phone number.

The Navigation action will trigger a pageRef navigation. This supports viewing a record, or any other pageRef navigation.

6. Extensibility

The UVM Component library 513 is the sole source of UEM constructed components, in one approach. However, a plugin may further customize or enhance a UVM Component via subclassing and property manipulation when using the direct construction method.

It is also possible to develop reusable, composable components, although it has implications on the Extension SDK (XSDK). When the UVM Component Library parses the UEM payload 511, if it finds an unrecognized component definition, it can query through a new UVM Component Providing service interface if any other source can provide that component. If another plugin implements that component, then it will return the UVM root node for that component which the UVM Component Library will place in the appropriate place in the UVM tree.

Additional plugins may be desired in an application to render a full experience. This requirement can be coordinated in any external build tools (e.g., Bento Builder, etc).

7. Versioning

The generated UEM and UVM Library can be aligned on available components, and properties of those components. As UEM is not versioned, it is possible that new components are sent in UEM to an older version of the UVM Library, or breaking changes to existing components (property name changes, etc.)

Each UEM Component can have a "version" property to indicate the supported version. For new components, there will not be a counterpart in the older UVM Component library and as such will ignore them. For newer versions of existing components one can either degrade gracefully (render with known properties), or ignore them as well.

In extreme examples, one could display an unsupported version UI if any components are an incorrect version or unrecognized.

8. Localization

UEM defines the tokenized label. MCF should be able to parse the tokenized label and retrieve the locale string. A sample of the tokenized label is:

"properties": {
"label": "$notifications"
}

Note that "notifications" start with "s" in this example MCF could use this token to get the locale string from the current application, then show the string associated with the application resource. If the string is not found, show the tokenized label "$notifications."

Feature Components and Data With MCF

We investigated how a feature (or plugin) can build their experience on top of the MCF. The solution should allow for feature-specific components ("Feature Components") that can be data bound with custom data sources, live side-by-side (or nested within) current standard MCF components, and can still be laid out with our current metadata-driven layout framework using current UEM/UVM patterns.

We have found that this is possible by separating the rnetadata→component layer into its own library and exposing a View Provider interface that features can implement and supply to the UVMMap. UVMMap will query each supplied View Provider if they can handle the component described in the UEM definition and if so, lay out the corresponding component.

While the solution proposed below separates the metadata layer from the MCF plugin, this layer is still "Plugin aware" to perform operations such as plugin navigation for Record-Row, etc.

Feature Components and Data

FIGS. 7A to 7E depict feature components and data with MCF, according to some example implementations.

Figure 7A:
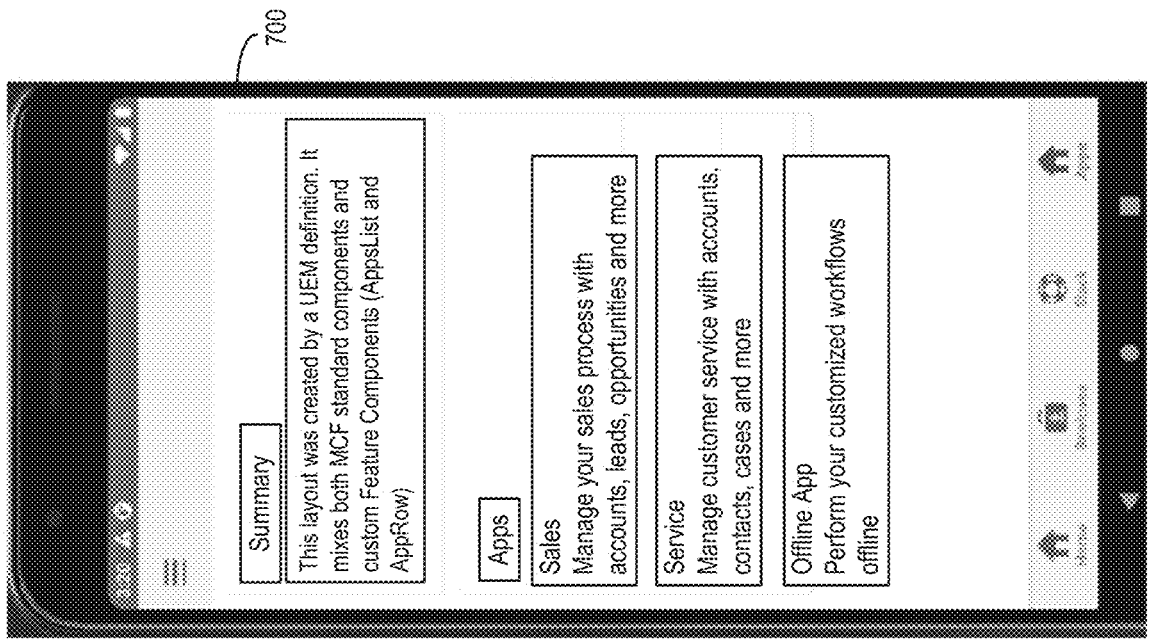
FIGS. 7A to 7E depict feature components and data with MCF, according to some example implementations.

FIG. 7A depicts a screenshot of a feature (App Launcher) that is driven by layout metadata referred to as app_iauncher.json, according to some example implementations.

In this screenshot 700 of a mobile device, an App Launcher feature allows the user to launch one of three apps relating to sales, service and offline application. This feature module defines Feature Components: AppsList and AppRow that use the feature-specific ViewModel to source the data.

The feature constructs the top level CotnposeView and supplies it with the view providers MCFBaseViewProvider and AppLauncherViewProvider. From this point it only needs to layout the UVMMapper with the UVMView root information to begin laying out the entire view hierarchy. Moreover, instead of two libraries (MCF components and MCF plugin), the UVM mapping is split into its own middle layer (UVMMap component 711). See FIG. 7B to 7E for further details.

Figure 7D:
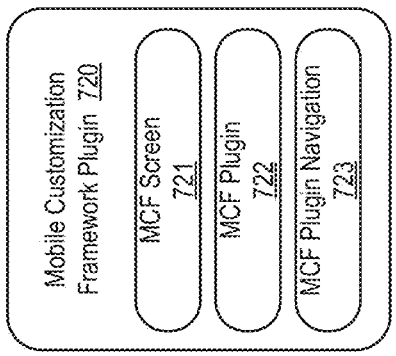
Figure 7C:
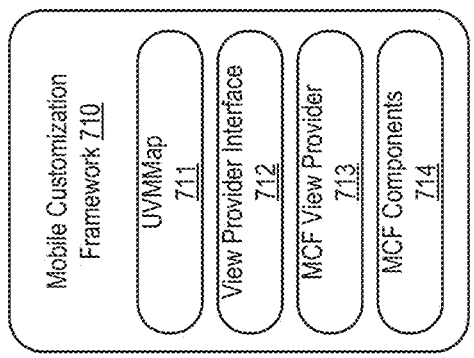
Figure 7B:
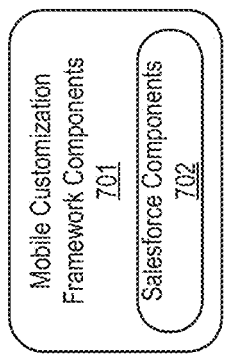

FIG. 7B depicts MCF components 701 associated with the view of FIG. 7A, according to some example implementations. The MCF components 701 include Salesforce components 702.

FIG. 7C depicts a MCF 710 associated with the view of FIG. 7A, according to some example implementations. The MCF 710 includes the UVMMap 711, View Provider Interface 712, MCF View Provider 713 and MCF Components 714.

FIG. 7D depicts a MCF plugin 720 associated with the view of FIG. 7A, according to some example implementations. The MCF Plugin includes MCF Screen 721, MCF Plugin 722 and MCF Plugin Navigation 723.

Figure 7E:
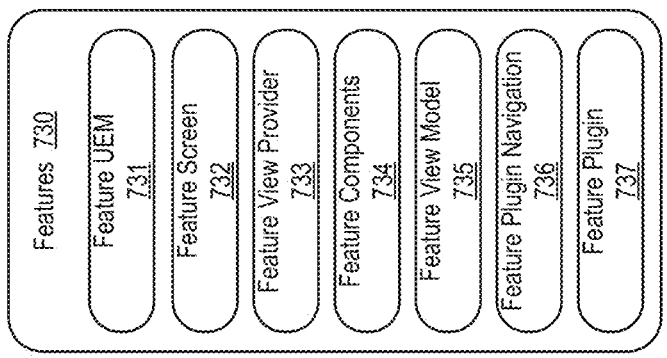

FIG. 7E depicts Features 730 associated with the view of FIG. 7A, according to some example implementations. The Features 730 include Feature UEM 731, Feature Screen 732, Feature View Provider 733, Feature Components 734, Feature View Model 735. Feature Plugin Navigation component 736 and Feature Plugin 737.

The App Launcher feature of FIG. 7A can implement the View Provider interface to provide the mapping of UVM definitions →Feature Components. By supplying this view provider (along with the standard MCF View Provider) in the Feature Screen and starting it with the UVMMapper, the UVMMap component can use the mappings to determine which component to show based on the metadata.

To initialize UVMMapper, one can pass in a UVMView root that contains the entire view hierarchy. This can be 'hand crafted' or one can use the UEMService to generate it from a local or remote UEM JSON.

CompositionLocal is an Android pattern that allows Jetpack Compose components to pass objects into child components implicitly. This pattern can be used to supply components with the Platform API and Record Context. One can also use it to supply View Providers.

MCF components can be nested inside Feature Components, and Feature Components can be nested inside MCF Components. This is possible by taking in UVMView as a parameter and calling UVMMapper with it. The framework will handle the nested mappings.

By calling the Feature View Model directly from Feature Components, the feature is responsible for binding the data. This is a different pattern than standard MCF components, since it is the base (Salesforce-prefixed) components bind data using the MobileCustomizationViewModel, which in turn delegates data operations to the given DataProvider.

In one approach, the data is hardcoded in the View Model. However, if the platform API is passed in to the view model, it can use the platform API to make the API calls and cache the data with whatever caching policy it chooses.

Example Components

FIGS. 8A to 8D depict example components for use with MCF, according to some example implementations.

FIG. 8A depicts example MCF static components 800, according to some example implementations. Each row refers to a different component. The first column 800a provides an associated visual display or preview of the component appearance in the UI. The second column 800b is a component name. The third column 800c is a definition (textual identifier). The fourth column 800d indicates whether the component is bindable, e.g., if the component can be bound to a data source, as in FIG. 6. The fifth column 800e indicates whether the component is nestable, e.g., if the component can be included within another component. The sixth column 800f indicates additional properties the component exposes for customization.

The first row refers to a container and is associated with a grey region 802. The second row refers to a card and is associated with a card 804 which provides a notification regarding a winter sale. The third row refers to a layout and is associated with a grey region 806. The fourth row refers to an action and is associated with icons for example actions of scan, take photo and upload in the region 808. The fifth row refers to a button and is associated with the button 810 (View Full List). The sixth row refers to text and is associated with example fonts (font sizes, colors, bold or normal) in the region 812. The seventh row refers to a search component and is associated with the search bar 814. The eighth row refers to a spacer and is associated with the white region 816. The ninth row refers to a divider and is associated with the grey region 818, FIG. 8B depicts example MCF data-bound components 820, according to some example implementations. The first row refers to a list and is associated with a list 830 having three rows 831, 832 and 833. The list is for opportunities such as for a salesperson. The second row refers to a record row and is associated with an example record row 835.

The first column 820a provides a preview of the component appearance, the second column 820b is a component name, the third column 820c is a definition (textual identifier), the fourth column 820d indicates whether the component is bindable, and the fifth column 820e indicates whether the component is nestable.

FIG. 8C depicts example MCF plugin components 840, according to some example implementations. The first row refers to a plug in event list and is associated with an example list 845 having a name 846 and two rows 847 and 848. The second row refers to a plug in recent list and is associated with an example list 850 having a name 851 and two rows 852 and 853. The third row refers to a plug in task list and is associated with an example list 855 having a name 856 and two rows 857 and 858. The fourth row refers to an event row and is associated with an example event row 860. The fifth row refers to a task item and is associated with an example task item 865.

The first column 840*a* provides a preview of the component appearance, the second column 840*b* is a component name, the third column 840*c* is a definition (textual identifier), the fourth column 840*d* indicates whether the component is bindable, and the fifth column 840*e* indicates whether the component is nestable.

FIG. 8D depicts example easy contact components, according to some example implementations. The example plugin components include contact row, list view list, list view row, contact list, all lists, legacy toggle, contact row action, feedback and a navigate back header.

The first column 860*a* provides a component name, the second column 860*b* is a definition (textual identifier), the third column 860*c* indicates whether the component is bindable, the fourth column 860*d* indicates whether the component is nestable, and the fifth column 860*e* indicates additional properties.

Briefcase Feature

Figure 9:
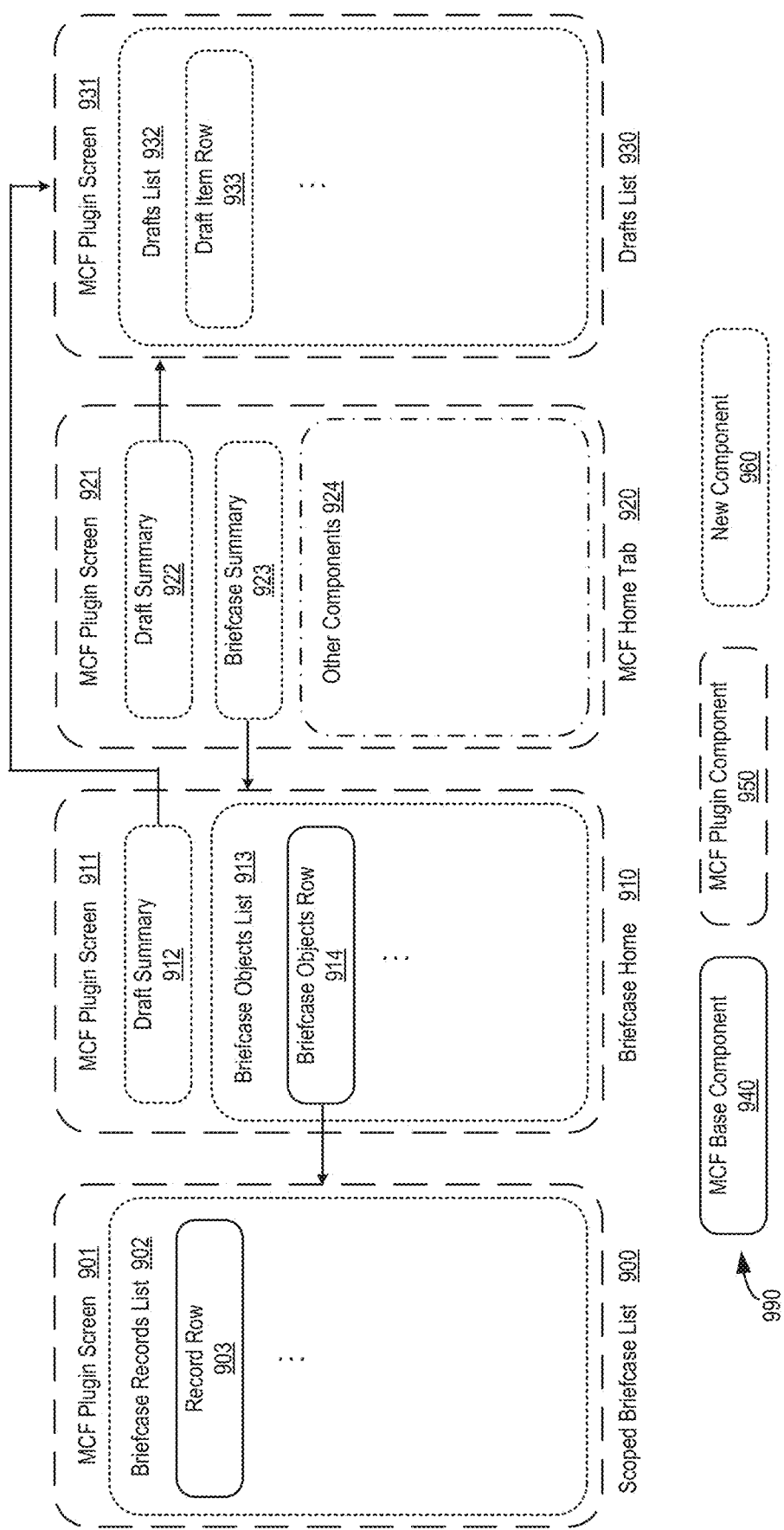
FIG. 9 depicts examples of views of a MCF briefcase feature, according to some example implementations.

FIG. 9 depicts examples of views of a MCF briefcase feature, according to some example implementations. In some case, such as for business users, the end user has a collection of records that are important to them. For example, a field service agent might have their appointments for the current day and want to have access to them throughout the day even if they are in an area without network connectivity. The briefcase feature fetches this data and saves it for offline access by the mobile device. The way the data is displayed can be guided by MCF.

The views of FIG. 9 include a scoped briefcase list 900, a briefcase home view 910, a MCF home tab 920 and a drafts list 930. The scoped briefcase list 900 includes a MCF plugin screen 901, a briefcase records list 902 and a number of record rows including an example record row 903. The briefcase home view 910 includes a MCF plugin screen 911, a draft summary 912, a briefcase objects list 913 and a briefcase objects row 914. The MCF home tab 920 includes a MCF plugin screen 911, a draft summary 922, a briefcase summary 923 and other components 924. The drafts list 930 includes a MCF plugin screen 931, a drafts list 932 and a number of draft item rows including an example draft item 933.

For example, the user may start at the MCF home tab 920. They can tap the briefcase summary component 923 to move to the briefcase home view 910. They can then tap the briefcase objects row 914 to move to the MCF plugin screen 901. Or, they can tap the draft summary component 912 to move to the MCF plugin screen 931. Another way to move to the MCF plugin screen 931 is to tap the draft summary component 922 of the MCF home tab 920.

All four of the views are driven by MCF and have common components. The components in the views can be identified according to a key 990 as being a MCF base component 940 (solid line border, see 903 and 914), a MCF Plugin Component 950 (dashed line border, see 901, 911, 921 and 931) or a New Component 960 (dotted line border, see 902, 912, 913, 922, 923 and 933).

Stencils

A major benefit of MCF is the ability for components to manage their own data loading and binding. However, as data loading times can be unpredictable, stencils can be shown to represent the 'shape' of components before they are loaded. Note that data binding occurs at the base component layer (SalesforceRecordRow, SalesforceList, etc.) and not at the metadata layer (MCFRecordRow, MCFList, etc.), in one approach.

FIGS. 10A to 10D involve stencils in a view for MCF data, according to some example implementations. The stencils comprise greyed out regions, for example, to represent regions of the view in which component data is being loaded. The stencils can have a size which is a close approximation to the size of the final appearance of the component. The stencils can be considered to be placeholders for subsequently loaded component data.

FIG. 10A depicts an example stencil for a record row component without nested components, according to some example implementations. The view 1000 includes stencil regions 1001, 1002 and 1003, which are replaced by an icon 1006, a first row of text 1007 and a second row of text 1008, respectively, in a view 1009, once the component data has loaded.

FIG. 10B depicts an example stencil for an event row component without nested components, according to some example implementations. In the view 1010, stencils 1011, 1012, 1013 and 1014 are replaced by text for event time 1016, title 1017, address 1018, and status 1019, respectively, in a view 1015 once the component data has loaded.

In FIGS. 10A and 10B, the components are populated together by loading the different components concurrently, rather than progressively by loading the different components serially, at different times.

Figure 10C:
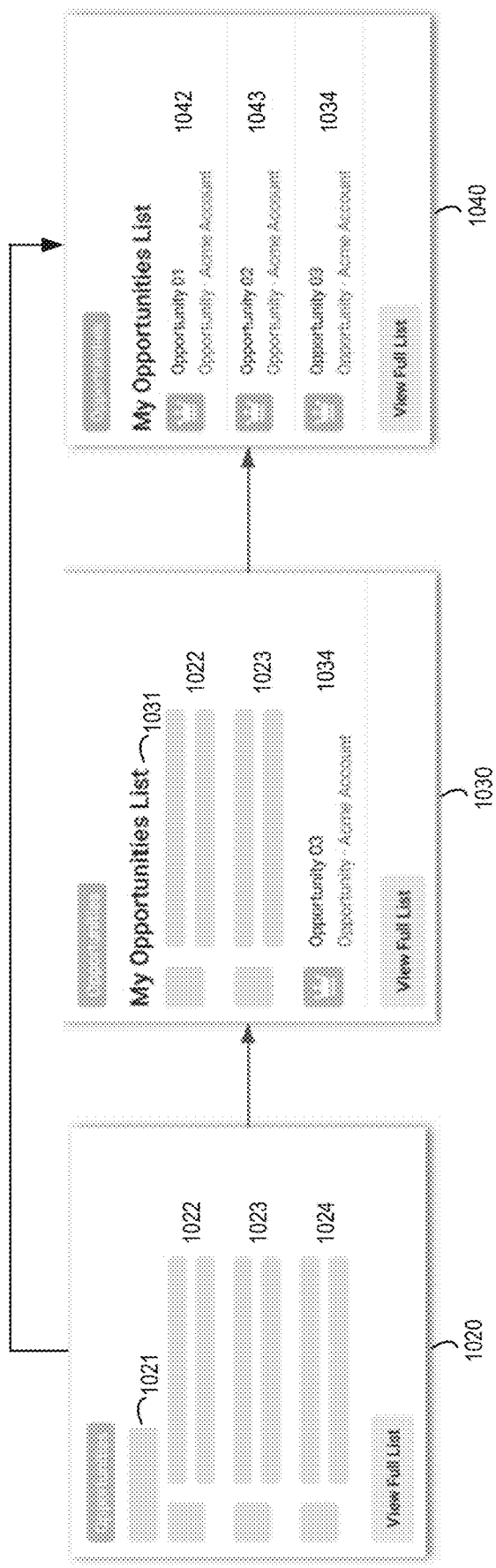

FIG. 10C depicts example sequences of stencils in which list data and record data are loaded, according to some example implementations. For components that have nested (or 'child') components, such as SalesforceList, if one know the number of the child components, one can still render the child components without any additional context. It's then up to the child components to show a stencil when the data context is missing. For example, in the view 1020, the stencil region 1021 is for a parent component, e.g., a list name, and the stencil regions 1022, 1023 and 1024 are for child components, e.g., rows. In the following view 1030, the components 1031 (text for list title) and 1034 (opportunity row) have loaded to replace the stencils 1021 and 1024, respectively. In the following view 1030, the components 1042 and 1043 (opportunity rows) have loaded to replace the stencils 1022 and 1023, respectively.

In the view 1020, SalesforceList shows the stencil 1021 for the list title. It then renders the SalesforceRecordRow components without data context as stencils 1022-1024. Since SalesforceRecordRow does not receive any data context such as title, subtitle or icon URL, it will show a stencil.

In the view 1030, the rows fetch data for themselves now that they have data context (e.g. record ID), they will continue to show a stencil until that data is loaded. In the view 1040, both list data and record data are now loaded.

In one approach, SalesforceRecordRow and SalesforceEventRow make additional calls to fetch their own data. A list such as MyOpportunities List is then loaded in two phases: a first data fetch to get the list of record IDs, then a second data fetch to get the individual row data. In one approach, the record rows are populated all at once (non-progressively) as represented by the sequence from view 1020 directly to the view 1040. Another option, as mentioned, is progressive loading, as represented by the sequence from view 1020 to view 1030 to view 1040. This can improve the user experience, although it may impact performance. If a first data fetch already includes the record data, progressive loading is unnecessary.

Figure 10D:
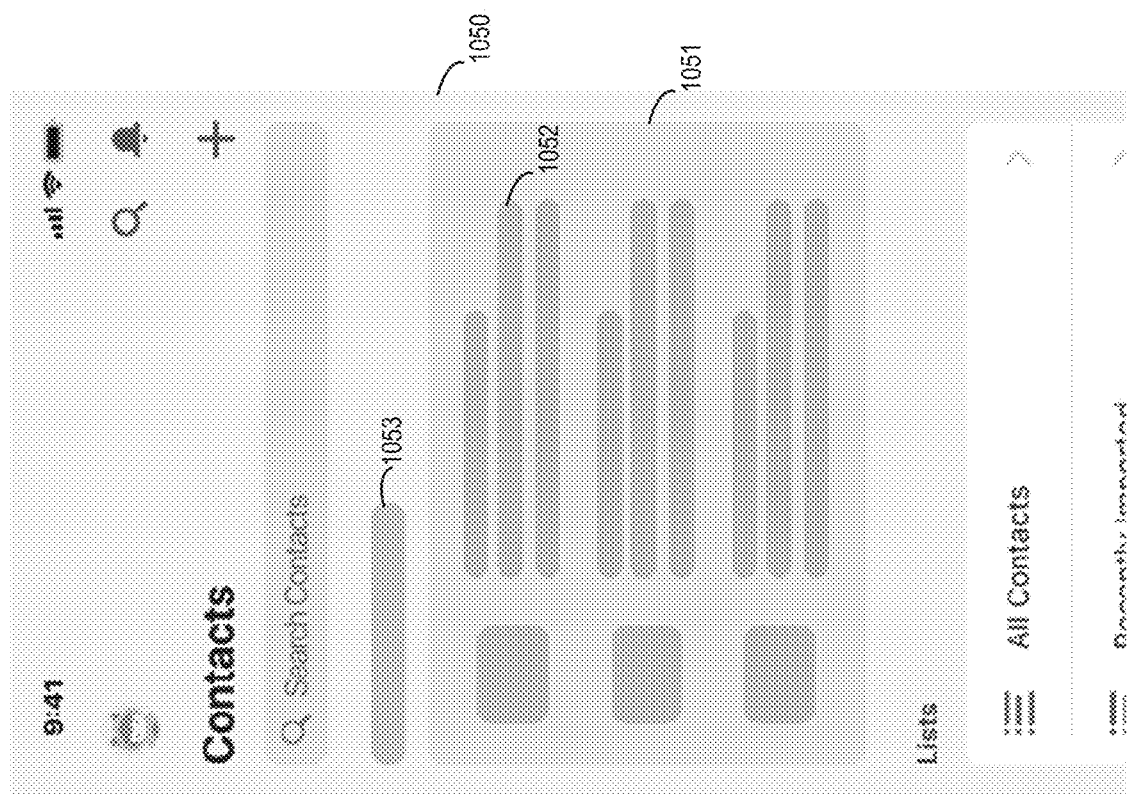

FIG. 10D depicts example stencils for a contact list, according to some example implementations. Feature components (such as ECContactsList and ECContactRow) should be able to follow the same data loading with stencils pattern as MCF. For instance, in one approach, ECContactsList should not try to stencil the entire sub-layout itself, it should only stencil the background and then continue to render the child components without data context, so that they can render their own stencil. In the view 1050, the title (Contacts) would not be stenciled since its 'hardcoded' to "Recent Contacts", but the ECContactList would show a light grey stencil 1051 with rounded edges and the ECContactRow components would show the darker grey stencils, e.g., 1052. A stencil 1053 represents the list title.

The stencils can have a specified color and a width and height corresponding to a width and height, respectively, of the text or icons represented by the stencils.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 11:
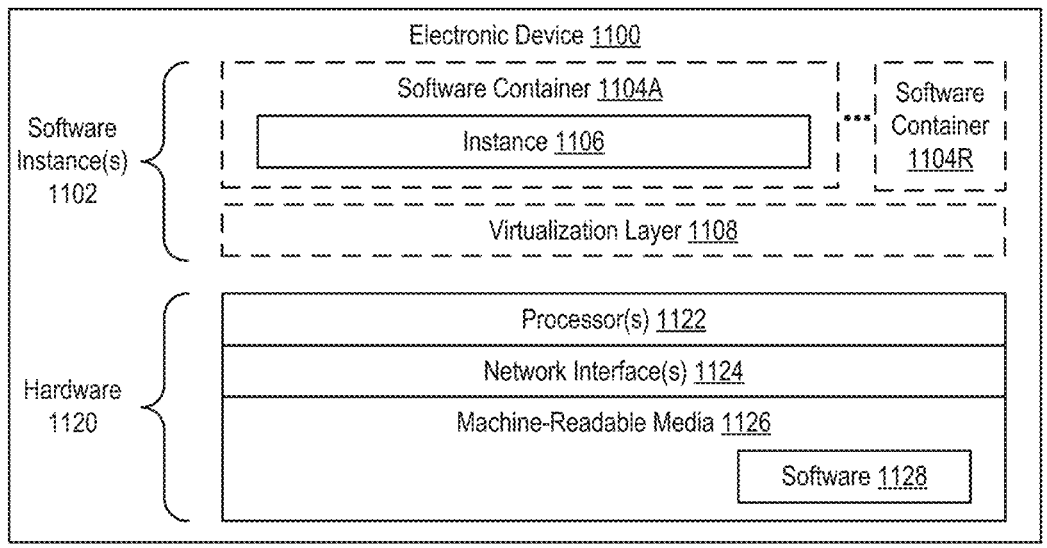
FIG. 11 is a block diagram illustrating an electronic device according to some example implementations.

FIG. 11 is a block diagram illustrating an electronic device 1100 according to some example implementations. One or more of such electronic devices can host the processes and components depicted in FIG. 1A and other figures.

FIG. 11 includes hardware 1120 comprising a set of one or more processor(s) 1122, a set of one or more network interfaces 1124 (wireless and/or wired), and machine-readable media 1126 having stored therein software 1128 (which includes instructions executable by the set of one or more processor(s) 1122). The machine-readable media 1126 may include non-transitory and/or transitory machine-readable media. Each of the previously described computing devices and the MCF may be implemented in one or more electronic devices 1100. In one implementation: 1) each of the computing devices is implemented in a separate one of the electronic devices 1100 (e.g., in end user devices where the software 1128 represents the software to implement at clients to interface directly and/or indirectly with the MCF (e.g., software 1128 represents a web browser, a native client, a portal, a command-line interface, and/or an application programming interface (API) based upon protocols such as Simple Object Access Protocol (SOAP), Representational State Transfer (REST), etc.)), 2) the MCF is implemented in a separate set of one or more of the electronic devices 1100 (e.g., a set of one or more server devices where the software 1128 represents the software to implement the MCF); and 3) in operation, the electronic devices implementing the clients and the MCF would be communicatively coupled (e.g., by a network) and would establish between them (or through one or more other layers and/or or other services) connections for submitting requests to the MCF and returning response to the clients. Other configurations of electronic devices may be used in other implementations (e.g., an implementation in which the client and the MCF are implemented on a single one of electronic device 1100).

During operation, an instance of the software 1128 (illustrated as instance 1106 and referred to as a software instance; and in the more specific case of an application, as an application instance) is executed. In electronic devices that use compute virtualization, the set of one or more processor(s) 1122 typically execute software to instantiate a virtualization layer 1108 and one or more software containers) 1104A-1104R (e.g., with operating system-level virtualization, the virtualization layer 1108 may represent a container engine (such as Docker Engine by Docker, Inc. or rkt in Container Linux by Red Hat, Inc.) running on top of (or integrated into) an operating system, and it allows for the creation of multiple software containers 1104A-1104R (representing separate user space instances and also called virtualization engines, virtual private servers, or jails) that may each be used to execute a set of one or more applications; with full virtualization, the virtualization layer 1108 represents a hypervisor (sometimes referred to as a virtual machine monitor (VMM)) or a hypervisor executing on top of a host operating system, and the software containers 1104A-1104R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1128 is executed within the software container 1104A on the virtualization layer 1108. In electronic devices where compute virtualization is not used, the instance 1106 on top of a host operating system is executed on the "hare metal" electronic device 1100. The instantiation of the instance 1106, as well as the virtualization layer 1108 and software containers 1104A-1104R if implemented, are collectively referred to as software instance(s) 1102.

Alternative implementations of an electronic device may have numerous variations from that described above. For example, customized hardware and/or accelerators might also be used in an electronic device.

Example Environment

Figure 12:
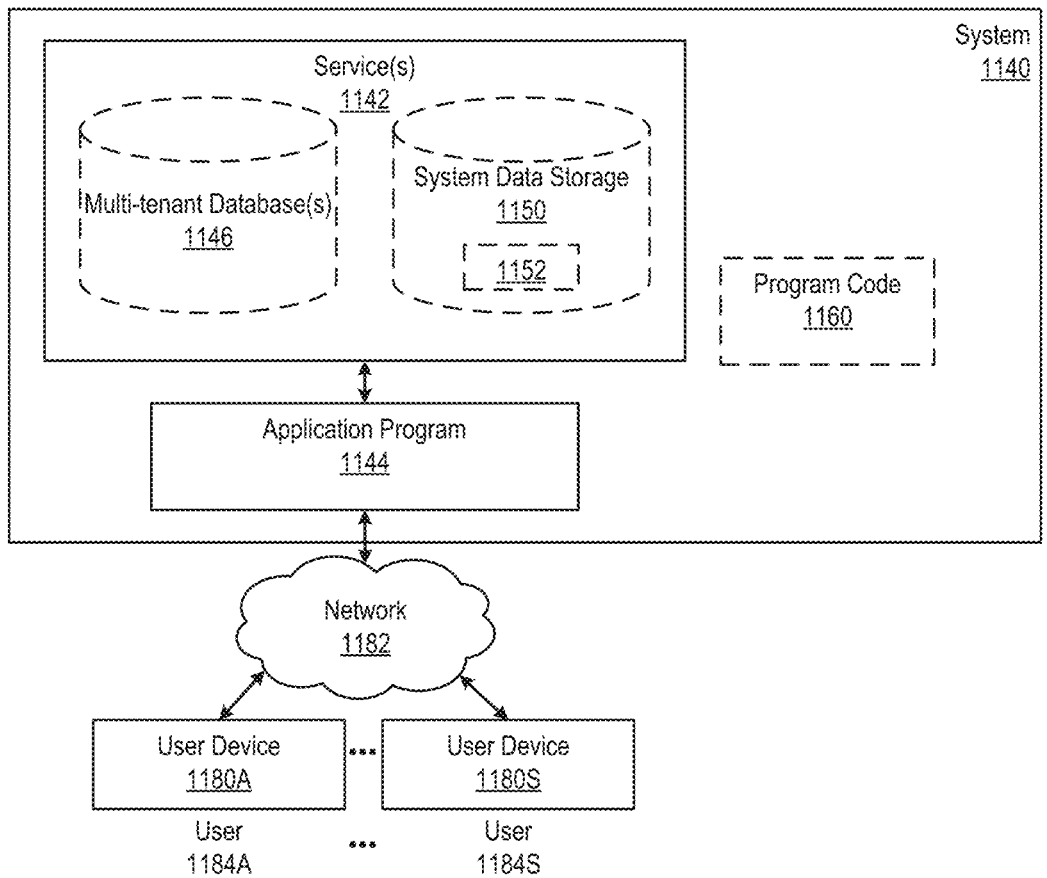
FIG. 12 is a block diagram of a deployment environment according to some example implementations.

FIG. 12 is a block diagram of a deployment environment according to some example implementations. A system 1140 includes hardware (e.g., a set of one or more server devices) and software to provide service(s) 1142, including the UI as discussed herein. In some implementations the system 1140 is in one or more datacenter(s). These datacenter(s) may be: 1) first party datacenter(s), which are datacenter(s) owned and/or operated by the same entity that provides and/or operates some or all of the software that provides the service(s) 1142; and/or 2) third-party datacenter(s), which are datacenter(s) owned and/or operated by one or more different entities than the entity that provides the service(s) 1142 (e.g., the different entities may host some or all of the software provided and/or operated by the entity that provides the service(s) 1142). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 1140 is coupled to user devices 1180A-1180S over a network 1182. The service(s) 1142 may be on-demand services that are made available to one or more of the users 1184A-1184S working for one or more entities other than the entity which owns and/or operates the on-demand services (those users sometimes referred to as outside users) so that those entities need not be concerned with building and/or maintaining a system, but instead may make use of the service(s) 1142 when needed (e.g., when needed by the users 1184A-1.184S). The service(s) 1142 may communicate with each other and/or with one or more of the user devices 1180A-1180S via one or more APIs (e.g., a REST API). In some implementations, the user devices 1180A-1180S are operated by users H 84A-1184S, and each may be operated as a client device and/or a server device. In some implementations, one or more of the user devices 1180A-1180S are separate ones of the electronic device 1100 or include one or more features of the electronic device 1100.

In some implementations, the system 1140 is a multi-tenant system((also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 1140 is a multi-tenant cloud computing architecture supporting multiple services, such as one or more of the following types of services:

MCF (see FIG. 1A and other figures); Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 1140 may include an application platform 1144 that enables PAAS for creating, managing, and executing one or more applications developed by the provider of the application platform 1144, users accessing the system 1140 via one or more of user devices 1180A-1180S, or third-party application developers accessing the system 1140 via one or more of user devices 1180A-1180S.

In some implementations, one or more of the service(s) 1142 may use one or more multi-tenant databases 1146, as well as system data storage 1150 for system data 1152 accessible to system 1140. In certain implementations, the system 1140 includes a set of one or more servers that are running on server electronic devices and that are configured to handle requests for any authorized user associated with any tenant (there is no server affinity for a user and/or tenant to a specific server). The user devices 1180A-1180S communicate with the server(s) of system 1140 to request and update tenant-level data and system-level data hosted by system 1140, and in response the system 1140 (e.g., one or more servers in system 1140) automatically may generate one or more Structured Query Language (SQL) statements (e.g., one or more SQL queries) that are designed to access the desired information from the multi-tenant database(s) 1146 and/or system data storage 1150.

In some implementations, the service(s) 1142 are implemented using virtual applications dynamically created at run time responsive to queries from the user devices 1180A-1180S and in accordance with metadata, including: 1) metadata that describes constructs (e.g., forms, reports, workflows, user access privileges, business logic) that are common to multiple tenants and/or 2) metadata that is tenant specific and describes tenant specific constructs (e.g., tables, reports, dashboards, interfaces, etc.) and is stored in a multi-tenant database. To that end, the program code 1160 may be a runtime engine that materializes application data from the metadata: that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1144 includes an application setup mechanism that supports application developers' creation and management of applications, which may be saved as metadata by save routines. Invocations to such applications, including the MCF, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1182 may be any one or any combination of a LAN (local area network), WAN (wide area network), telephone network, wireless network, point-to-point network, star network, token ring network, hub network, or other appropriate configuration. The network may comply with one or more network protocols, including an institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 1140 and the user devices 1180A-1180S.

Each user device 1180A-1180S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1140. For example, the user interface device can be used to access data and applications hosted by system. 1140, and to perform searches on stored data, and otherwise allow one or more of users 1184A-1184S to interact with various GUI pages that may be presented to the one or more of users 1184A-1184S.

User devices 1180A-1180S might communicate with system 1140 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1180A-1180S might include an HTTP client, commonly referred to as a "browser," for sending and receiving HTTP messages to and from server(s) of system 1140, thus allowing users 1184A-1184S of the user devices 1180A-1180S to access, process and view information, pages and applications available to it from system 1140 over network 1182.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. An apparatus, comprising:
   one or more processors; and
   a non-transitory machine-readable storage medium that provides instructions that, when executed by the one or more processors, configures the apparatus to perform operations comprising, at a native application of a computing device:
   launching a view of a user interface (UI) of the native application;
   in response to the launching, sending a request which identifies the view to a metadata service;
   receiving metadata from the metadata service in response to the request, wherein the metadata identifies one or more components of the native application and specifies a layout of the one or more components;
   receiving a definition from a registry of providers, wherein a first component of the one or more components is mapped from the received definition; and
   rendering the one or more components, including the first component, in one or more positions in the view according to the layout.

2. The apparatus of claim 1, wherein the rendering comprises selecting a display parameter from among a plurality of available display parameters of the one or more components according to the metadata.

3. The apparatus of claim 2, wherein the display parameter comprises at least one of a font size, a font type, a color and a list size.

4. The apparatus of claim 1, wherein the one or more components comprise static components.

5. The apparatus of claim 1, wherein the one or more components comprise data-bound components.

6. The apparatus of claim 1, wherein the one or more components comprise plugin components.

7. The apparatus of claim 1, wherein the operations performed at the native application further comprise nesting one component within another component according to the metadata which specifies that the layout.

8. The apparatus of claim 1, wherein the one or more components are hard coded into the native application.

9. The apparatus of claim 1, wherein the operations performed at the native application further comprise: while loading data of the one or more components, displaying a stencil at the one or more positions in the view.

10. A non-transitory machine-readable storage medium that provides instructions that, when executed by one or more processors, configures the one or more processors to perform operations comprising:
    receiving a request from a native application of a computing device, the request identifies a view of a user interface (UI) of the native application;

in response to the request, accessing metadata corresponding to the view, wherein the metadata identifies one or more components of the native application and specifies a layout of the one or more components;

receiving a definition from a registry of providers, wherein a first component of the one or more components is mapped from the received definition; and transmitting the metadata, including the first component, to the native application.

11. The non-transitory machine-readable storage medium of claim 10, wherein the accessing the metadata comprises accessing a database having different metadata corresponding to different views, and identifying the metadata corresponding to the view based on an identifier of the view in the request.

12. The non-transitory machine-readable storage medium of claim 10, wherein the accessing the metadata comprises accessing a multi-tenant database having different metadata for different tenants, and identifying the metadata corresponding to a tenant of the native application.

13. The non-transitory machine-readable storage medium of claim 10, wherein the operations performed further comprise:

receiving requests identifying views of UIs from multiple instances of the native application; and performing a machine learning to identify usage patterns of the UIs based on the requests.

14. The non-transitory machine-readable storage medium of claim 10, wherein the operations performed further comprise:

receiving and storing updated metadata for the view; and transmitting the updated metadata to the native application in response to a subsequent request from the native application of the computing device for metadata for the view of the UI.

15. The non-transitory machine-readable storage medium of claim 10, wherein the metadata specifies at least one of a font size, a color and a list size for the view.

16. The non-transitory machine-readable storage medium of claim 10, wherein the metadata corresponding to the view is updatable.

17. A method, comprising:

launching a view of a user interface (UI) of a native application;

in response to the launching, sending a request which identifies the view to a metadata service;

receiving metadata from the metadata service in response to the request;

based on the metadata, accessing from the native application, a parent component and a selected child component which is selected from among a plurality of different types of available child components of the native application;

receiving a definition from a registry of providers, wherein a first component of the one or more components is mapped from the received definition; and rendering the parent component and the selected child component in the view according to the metadata, and rendering the first component in the view.

18. The method of claim 17, wherein the parent component comprises a list and the selected child component comprises a row in the list, and the plurality of different types of available child components comprise different types of rows.

19. The method of claim 17, wherein the metadata identifies the selected child component based on a user of the native application.

20. The method of claim 17, wherein the rendering comprises displaying the parent component and the selected child component in positions in the view which are specified by the metadata.

\* \* \* \* \*